(12) United States Patent
Lin et al.

(10) Patent No.: US 10,187,878 B2
(45) Date of Patent: Jan. 22, 2019

(54) METHOD AND APPARATUS FOR IMPROVING A TRANSMISSION USING A CONFIGURED RESOURCE IN A WIRELESS COMMUNICATION SYSTEM

(71) Applicant: ASUSTeK Computer Inc., Taipei (TW)

(72) Inventors: Ko-Chiang Lin, Taipei (TW); Li-Chih Tseng, Taipei (TW); Meng-Hui Ou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 11 days.

(21) Appl. No.: 15/475,190

(22) Filed: Mar. 31, 2017

(65) Prior Publication Data

US 2017/0289995 A1 Oct. 5, 2017

Related U.S. Application Data

(60) Provisional application No. 62/316,799, filed on Apr. 1, 2016.

(51) Int. Cl.
*H04W 72/00* (2009.01)
*H04W 72/04* (2009.01)
*H04W 72/14* (2009.01)
*H04W 72/12* (2009.01)

(52) U.S. Cl.
CPC ... *H04W 72/0413* (2013.01); *H04W 72/0446* (2013.01); *H04W 72/12* (2013.01); *H04W 72/14* (2013.01); *H04W 72/1278* (2013.01)

(58) Field of Classification Search
CPC ......... H04W 72/0413; H04W 72/0446; H04W 72/12; H04W 72/1278; H04W 72/14
See application file for complete search history.

(56) References Cited

U.S. PATENT DOCUMENTS

2010/0142467 A1 6/2010 Tiirola et al.
2011/0205991 A1* 8/2011 Kim .................. H04W 72/0413
370/329

(Continued)

FOREIGN PATENT DOCUMENTS

TW 201531135 8/2015

OTHER PUBLICATIONS

3GPP TSG-Ran WG2, Meeting #91, Beijing, China, Aug. 24-28, 2015 (R2-153294).

(Continued)

*Primary Examiner* — Mohamed A Kamara
(74) *Attorney, Agent, or Firm* — Blue Capital Law Firm, P.C.

(57) ABSTRACT

A method and apparatus are disclosed for improving a transmission using a configured resource in a wireless communication system. In one embodiment, the method includes an uplink grant is available for the UE in a TTI, wherein the UE does not have data available for transmission. The method further includes the UE transmitting a physical control information on a data channel according to the uplink grant if the physical control information needs to be transmitted in the TTI. The method also includes the UE skipping the uplink grant if the physical control information does not need to be transmitted in the TTI.

28 Claims, 23 Drawing Sheets

(56) References Cited

U.S. PATENT DOCUMENTS

| | | | | |
|---|---|---|---|---|
| 2013/0308610 | A1* | 11/2013 | Bergstrom | H04W 56/00 370/336 |
| 2015/0163791 | A1 | 6/2015 | Chen | |
| 2015/0282148 | A1 | 10/2015 | Le | |
| 2016/0242176 | A1* | 8/2016 | Sun | H04W 72/0446 |
| 2017/0013565 | A1* | 1/2017 | Pelletier | H04W 52/146 |
| 2017/0208607 | A1* | 7/2017 | Quan | H04W 72/12 |
| 2018/0091269 | A1* | 3/2018 | Ratilainen | H04L 5/0032 |

OTHER PUBLICATIONS

European Search Report from corresponding EP Application No. 17164114.5, dated Aug. 25, 2017.

Office Action from TIPO in corresponding TW Patent Application No. 106111274, dated Dec. 14, 2017.

3GPP TR 36.881 V0.6.0, 3rd Generation Partnership Project; Technical Specification Group Radio Access Network; Evolved Universal Terrestrial Radio Access (E-UTRA); Study on latency reduction techniques for LTE, (Feb. 29, 2016), first three pages only.

3GPP TSG RAN Meeting #67, RP-150310-Motivation for new proposed SI, (Mar. 9, 2015).

Office Action from corresponding KR Application No. 10-2017-0042256, dated Jul. 4, 2018.

Intel Corporation: "Protocol impact of fast uplink access solution for latency reduction", 3GPP DRAFT; R2-153294 Protocol Impact of Fast Uplink Access Solution for Latency Reduction, 3rd Generation Partnership Project (3GPP), Mobile Competence Centre ; 650, Route Des Lucioles ; F-06921 Soph vol. RAN WG2, no. Beijing China; 20150824-20150828 , Aug. 23, 2015 (Aug. 23, 2015), XP051004O42, Retrieved from the Internet: https://portal.3gpp.org/ngppapp/CreateTdoc.aspx?mode=view&contributionId=651850.

Office Action from corresponding TW Application No. 106111274, dated Jun. 27, 2018.

* cited by examiner

| $Q_m$ | Encoded HARQ-ACK |
|---|---|
| 2 | $[o_0^{ACK}\ y]$ |
| 4 | $[o_0^{ACK}\ y\ x\ x]$ |
| 6 | $[o_0^{ACK}\ y\ x\ x\ x\ x]$ |

FIG. 7 (PRIOR ART)

| $Q_m$ | Encoded HARQ-ACK |
|---|---|
| 2 | $[o_0^{ACK}\ o_1^{ACK}\ o_2^{ACK}\ o_0^{ACK}\ o_1^{ACK}\ o_2^{ACK}]$ |
| 4 | $[o_0^{ACK}\ o_1^{ACK}\ x\ x\ o_2^{ACK}\ o_0^{ACK}\ x\ x\ o_1^{ACK}\ o_2^{ACK}\ x\ x]$ |
| 6 | $[o_0^{ACK}\ o_1^{ACK}\ x\ x\ x\ x\ o_2^{ACK}\ o_0^{ACK}\ x\ x\ x\ x\ o_1^{ACK}\ o_2^{ACK}\ x\ x\ x\ x]$ |

FIG. 8 (PRIOR ART)

| $i$ | $[w_0^{ACK}\ w_1^{ACK}\ w_2^{ACK}\ w_3^{ACK}]$ |
|---|---|
| 0 | [1 1 1 1] |
| 1 | [1 0 1 0] |
| 2 | [1 1 0 0] |
| 3 | [1 0 0 1] |

FIG. 9 (PRIOR ART)

| $Q_m$ | Encoded RI |
|---|---|
| 2 | $[o_0^{RI}\ y]$ |
| 4 | $[o_0^{RI}\ y\ x\ x]$ |
| 6 | $[o_0^{RI}\ y\ x\ x\ x\ x]$ |

FIG. 10 (PRIOR ART)

| $Q_m$ | Encoded RI |
|---|---|
| 2 | $[o_0^{RI}\ o_1^{RI}\ o_2^{RI}\ o_0^{RI}\ o_1^{RI}\ o_2^{RI}]$ |
| 4 | $[o_0^{RI}\ o_1^{RI}\ x\ x\ o_2^{RI}\ o_0^{RI}\ x\ x\ o_1^{RI}\ o_2^{RI}\ x\ x]$ |
| 6 | $[o_0^{RI}\ o_1^{RI}\ x\ x\ x\ x\ o_2^{RI}\ o_0^{RI}\ x\ x\ x\ x\ o_1^{RI}\ o_2^{RI}\ x\ x\ x\ x]$ |

FIG. 11 (PRIOR ART)

| $o_0^{RI}$ | RI |
|---|---|
| 0 | 1 |
| 1 | 2 |

FIG. 12 (PRIOR ART)

| $o_0^{RI}, o_1^{RI}$ | RI |
|---|---|
| 0, 0 | 1 |
| 0, 1 | 2 |
| 1, 0 | 3 |
| 1, 1 | 4 |

FIG. 13 (PRIOR ART)

| $o_0^{RI}, o_1^{RI}, o_2^{RI}$ | RI |
|---|---|
| 0, 0, 0 | 1 |
| 0, 0, 1 | 2 |
| 0, 1, 0 | 3 |
| 0, 1, 1 | 4 |
| 1, 0, 0 | 5 |
| 1, 0, 1 | 6 |
| 1, 1, 0 | 7 |
| 1, 1, 1 | 8 |

FIG. 14 (PRIOR ART)

| CP configuration | Column Set |
|---|---|
| Normal | {1, 4, 7, 10} |
| Extended | {0, 3, 5, 8} |

FIG. 15 (PRIOR ART)

| CP configuration | Column Set |
|---|---|
| Normal | {2, 3, 8, 9} |
| Extended | {1, 2, 6, 7} |

FIG. 16 (PRIOR ART)

| Configured Resource is Available | Scenario 1 | Scenario 2 |
|---|---|---|
| PHY control info needs to be transmitted in a TTI | yes | yes |
| Data available for Tx | yes | yes |
| Simultaneous Tx on PUCCH and PUSCH | no | Yes but power is not enough to transmit on both |
| → Prior Art | Transmit on PUSCH | Transmit on PUCCH |
| → Idea | Transmit on PUCCH | Transmit on PUSCH |

FIG. 18

| When physical control information needs to be transmitted in a TTI: | Simultaneous transmission on PUCCH and PUSCH is enabled | Simultaneous transmission on PUCCH and PUSCH is disabled |
|---|---|---|
| The UE has data | Transmit on PUCCH | Transmit on PUCCH |
| The UE has no data | Transmit on PUCCH | Transmit on PUCCH |

FIG. 19 (PRIOR ART)

| When physical control information needs to be transmitted in a TTI : | Simultaneous transmission on PUCCH and PUSCH is enabled | Simultaneous transmission on PUCCH and PUSCH is disabled |
|---|---|---|
| The UE has data | Transmit on PUCCH | Transmit on PUCCH |
| The UE has no data | Transmit on PUCCH | Transmit on PUCCH |

FIG. 20

| When physical control information needs to be transmitted in a TTI: | Simultaneous transmission on PUCCH and PUSCH is enabled | |
|---|---|---|
| | Tx power is enough | Tx power is not enough |
| The UE has data | Transmit on PUCCH | Transmit on PUCCH |
| The UE has no data | Transmit on PUCCH | Transmit on PUCCH |

FIG. 21 (PRIOR ART)

| When physical control information needs to be transmitted in a TTI: | Simultaneous transmission on PUCCH and PUSCH is enabled | |
|---|---|---|
| | Tx power is enough | Tx power is not enough |
| The UE has data | Transmit on PUCCH | Transmit on PUSCH |
| The UE has no data | Transmit on PUCCH | Transmit on PUCCH |

FIG. 22

METHOD AND APPARATUS FOR IMPROVING A TRANSMISSION USING A CONFIGURED RESOURCE IN A WIRELESS COMMUNICATION SYSTEM

CROSS-REFERENCE TO RELATED APPLICATIONS

The present application claims the benefit of U.S. Provisional Patent Application Ser. No. 62/316,799 filed on Apr. 1, 2016, the entire disclosure of which is incorporated herein in their entirety by reference.

FIELD

This disclosure generally relates to wireless communication networks, and more particularly, to a method and apparatus for improving a transmission using a configured resource in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed for improving a transmission using a configured resource in a wireless communication system. In one embodiment, the method includes an uplink grant is available for a UE in a TTI (Transmission Time Interval), wherein the UE does not have data available for transmission. The method further includes the UE transmitting a physical control information on a data channel according to the uplink grant if the physical control information needs to be transmitted in the TTI. The method also includes the UE skipping the uplink grant if no physical control information needs to be transmitted in the TTI.

BRIEF DESCRIPTION OF THE DRAWINGS

FIG. 7 is a reproduction of Table 5.2.2.6-1 of 3GPP TS 36.212 v13.0.0.

FIG. 8 is a reproduction of Table 5.2.2.6-2 of 3GPP TS 36.212 v13.0.0.

FIG. 9 is a reproduction of Table 5.2.2.6-A of 3GPP TS 36.212 v13.0.0.

FIG. 10 is a reproduction of Table 5.2.2.6-3 of 3GPP TS 36.212 v13.0.0.

FIG. 11 is a reproduction of Table 5.2.2.6-4 of 3GPP TS 36.212 v13.0.0.

FIG. 12 is a reproduction of Table 5.2.2.6-5 of 3GPP TS 36.212 v13.0.0.

FIG. 13 is a reproduction of Table 5.2.2.6-6 of 3GPP TS 36.212 v13.0.0.

FIG. 14 is a reproduction of Table 5.2.2.6-7 of 3GPP TS 36.212 v13.0.0.

FIG. 15 is a reproduction of Table 5.2.2.8-1 of 3GPP TS 36.212 v13.0.0.

FIG. 16 is a reproduction of Table 5.2.2.8-2 of 3GPP TS 36.212 v13.0.0.

FIG. 18 is a table according to one exemplary embodiment.

FIG. 19 is a table according to one exemplary embodiment.

FIG. 20 is a table according to one exemplary embodiment.

FIG. 21 is a table according to one exemplary embodiment.

FIG. 22 is a table according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: RP-150465, "New SI proposal: Study on Latency reduction techniques for LTE", Ericsson, Huawei; RP-150310, "Study on Latency reduction techniques For LTE", Ericsson; TS 36.321 v12.5.0, "E-UTRA MAC protocol specification (Release 12)"; TS 36.331 v12.5.0, "E-UTRA RRC protocol specification (Release 12)"; TS 36.213 v12.5.0, "E-UTRA Physical layer procedures (Release 12)"; TR 36.881 V0.6.0, "E-UTRA Study on latency reduction techniques for LTE (Release 13)"; and TS 36.212 V13.0.0, "E-UTRA Multiplexing and channel coding (Release 13)". The standards and documents listed above are hereby expressly incorporated by reference in their entirety.

Figure 1:
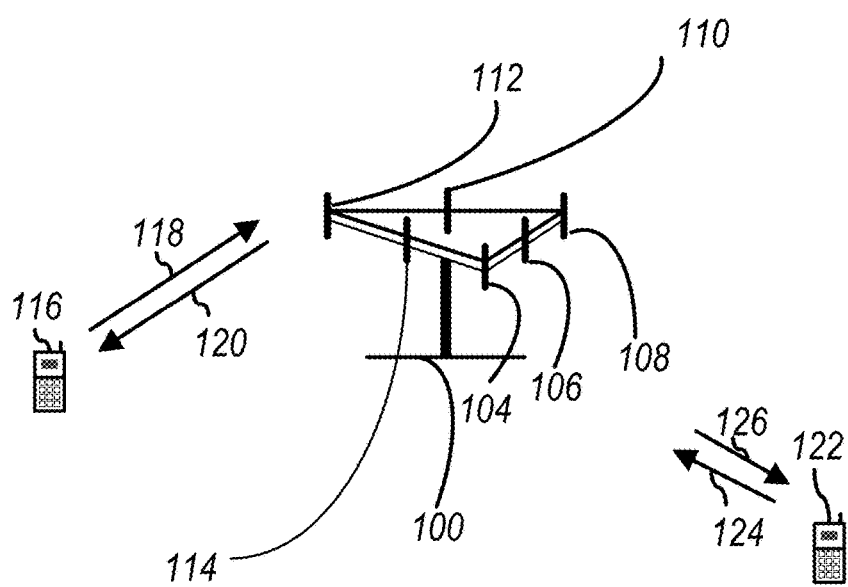
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
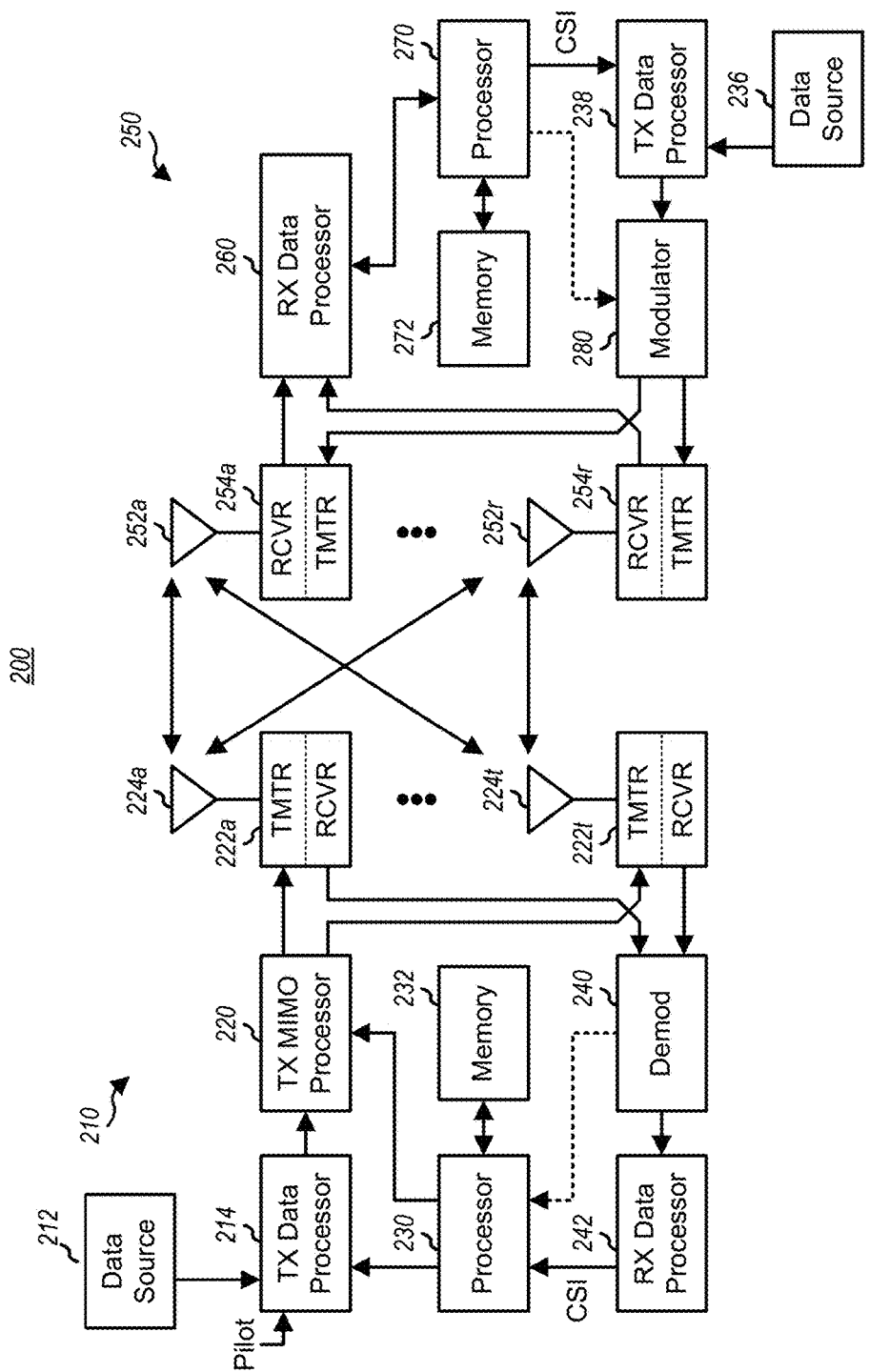
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250.

Processor 230 then determines which pre-coding matrix to use for determining the beamforming weights then processes the extracted message.

Figure 3:
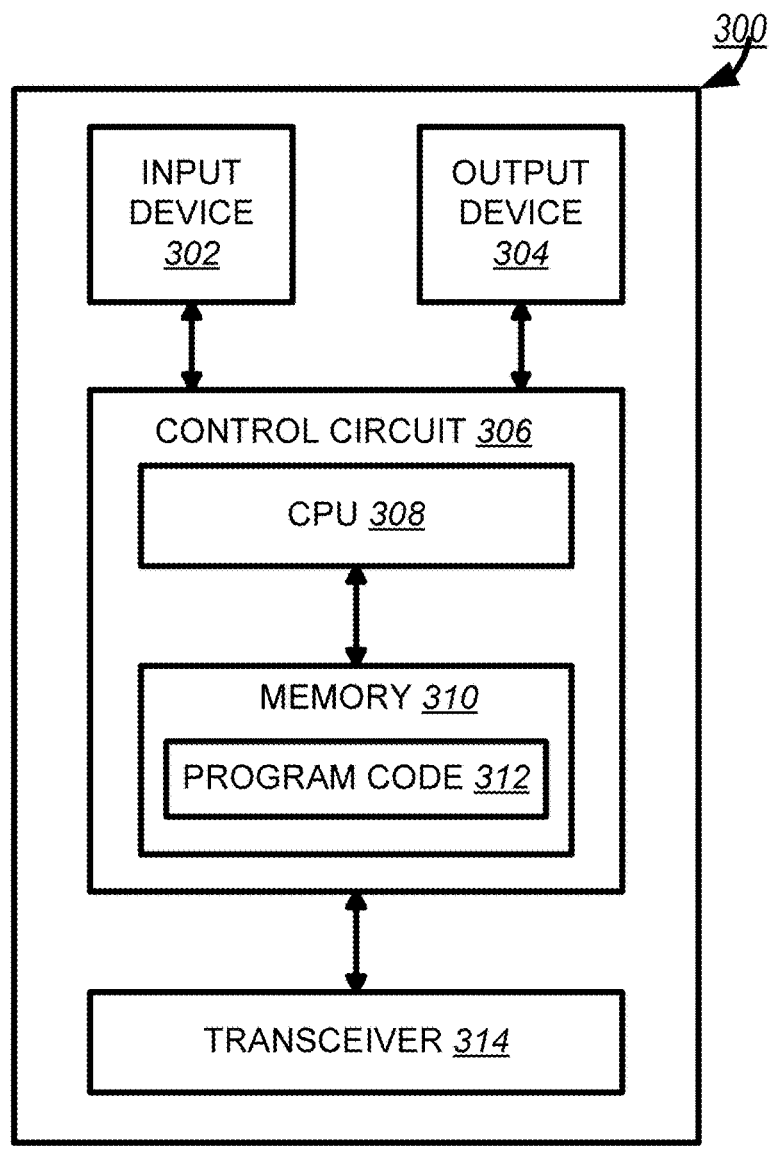
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
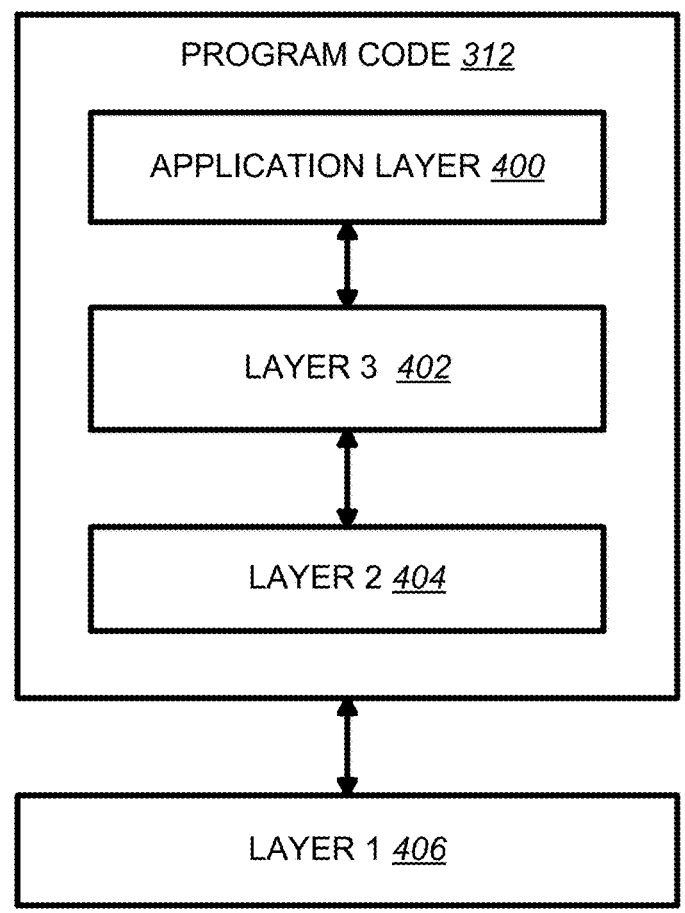
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Packet data latency is one of the important metrics for performance evaluation. Reducing packet data latency improves the system performance. In 3GPP RP-150465, the study item "Study on latency reduction techniques for LTE" generally aims to investigate and standardize some techniques of latency reduction.

According to 3GPP RP-150465, the objective of the study item is generally to study enhancements to the E-UTRAN radio system in order to significantly reduce the packet data latency over the LTE Uu air interface for an active UE and significantly reduce the packet data transport round trip latency for UEs that have been inactive for a longer period (in connected state). The study area includes resource efficiency, including air interface capacity, battery lifetime, control channel resources, specification impact and technical feasibility. Both FDD (Frequency Division Duplex) and TDD (Time Division Duplex) duplex modes are considered.

According to 3GPP RP-150465, two following areas should be studies and documented:
1. Fast Uplink Access Solutions—
For active UEs and UEs that have been inactive a longer time, but are kept in RRC Connected, the focus should be (i) on reducing user plane latency for the scheduled UL transmission, and (ii) on getting a more resource efficient solution with protocol and signaling enhancements, compared to the pre-scheduling solutions allowed by the standard today, both with and without preserving the current TTI (Transmission Time Interval) length and processing times.
2. TTI Shortening and Reduced Processing Times—
Assess specification impact and study feasibility and performance of TTI lengths between 0.5 ms and one OFDM (Orthogonal Frequency Division Multiplexing) symbol, taking into account impact on reference signals and physical layer control signaling.

Figure 5:
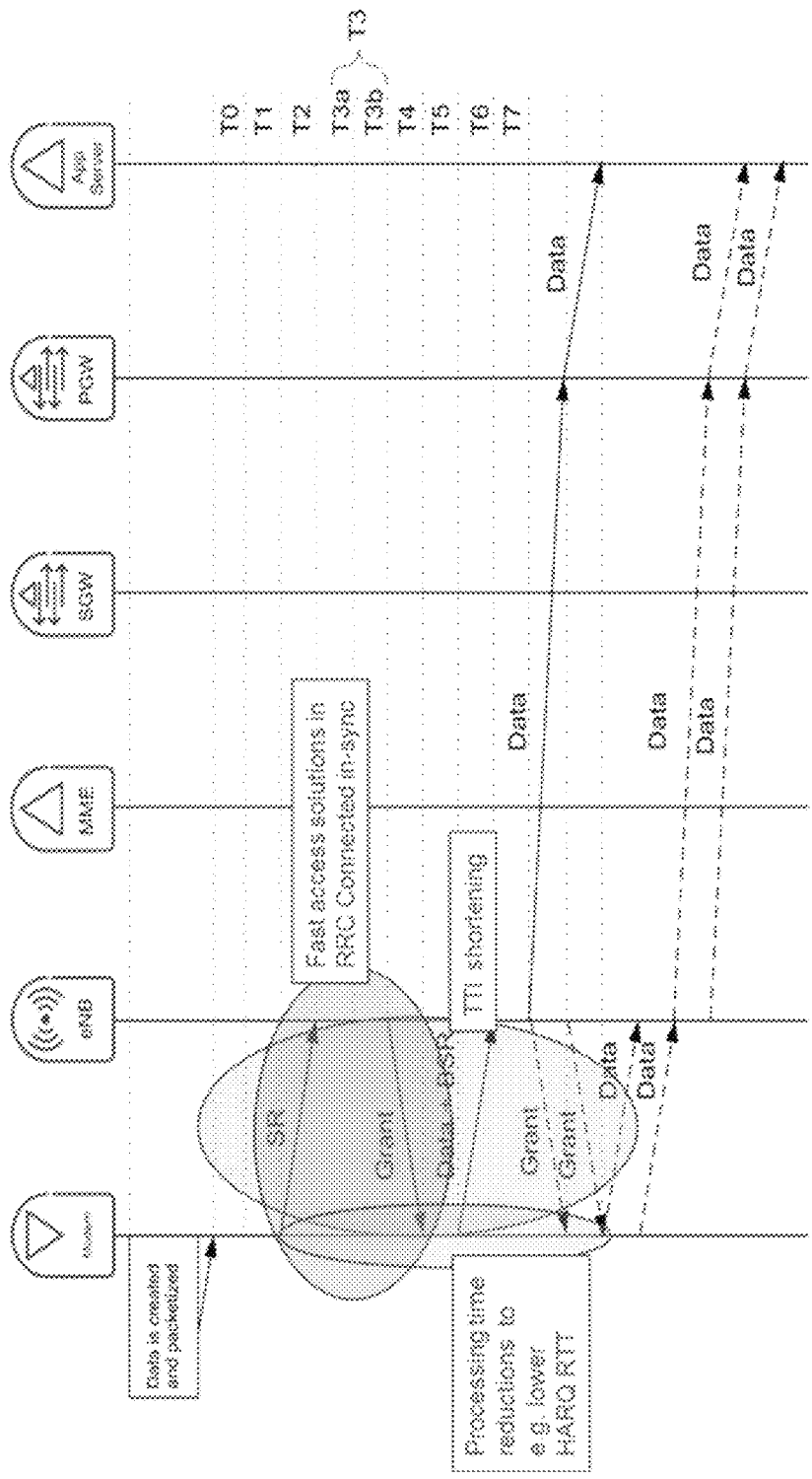
FIG. 5 is a reproduction of FIG. 1 of 3GPP RP-150310.

FIG. 5 is a reproduction of Figure 1 of 3GPP RP-150310. FIG. 5 generally illustrates the improvement corresponding to the areas.

In 3GPP RP-150310, a candidate of fast uplink access solutions was raised:
Pre-grant→fast uplink access but with limited throughput
Resources can be allocated with (modified) SPS
Remove the requirement to send padding when no data is in buffer→saves battery resources when inactive
Good throughput per watt statistics
Switch to dynamic scheduling when entering active phase→optimizing throughput when having lot of data in send buffer Detailed result of the study can be found in 3GPP TR 36.881 v0.6.0 as quoted below, which confirmed that it would be beneficial to skip the configured grant if there is no data or regular MAC (Medium Access Control) CE (Control Element) to be sent:
8.1 Semi-Persistent Scheduling
With current Semi-Persistent Scheduling (SPS), the eNodeB may configure SPS periodicity via dedicated RRC signalling. Current minimum SPS periodicity is 10 ms. Supporting a SPS periodicity of 1 TTI is beneficial as this may reduce the latency of initial UL transmissions. This would allow UL transmission in consecutive subframes.
8.2 UL Grant Reception
In current specifications, the UE sends a MAC PDU containing a MAC CE for padding BSR and optionally padding bits in response to an allocated UL dynamic or configured grant even if no data is available for transmission in the UE buffer and no other regular MAC CE is needed to be sent. It is beneficial to allow UEs to skip (most) dynamic and configured uplink grants if no data is available for transmission. With frequent UL grants, allowing skipping UL grants may decrease UL interference and improve UE battery efficiency. The UE will continue to send one or more regular MAC CE(s), if any. The eNB may enable skipping UL grants by RRC dedicated signalling.
8.2.1 Configured SPS Activation and Deactivation
The SPS resources are UE specific and may be reserved (configured and active) for a longer period in time. As such, it is in some cases considered useful for the eNB to be timely aligned with the UE state on activated or deactivated SPS resource(s), and if UL transmissions might occur in the granted SPS resource allocation instances.
An acknowledgement in response to a PDCCH grant indication activation could for example consist of an UE transmitted new MAC PDU containing zero MAC SDUs on the first SPS granted resource to indicate successful activation when the UE buffer is empty.
If the PDCCH grant indicating activation is not received, and UE has UL data to be transmitted, it is assumed that the UE would initiate a SR procedure if no other action is performed by the eNB.
For Deactivation, the eNB can indicate release of SPS resources on PDCCH. Also in these cases the eNB would in some cases benefit from being timely aligned with the UE state on activate or deactivated SPS resource(s).
Similarly to activation, a single transmission could be used also as deactivation acknowledgement as in instances of skipped transmissions as the absence of a UL transmission cannot be used as an implicit deactivation/release acknowledgement mechanism. Other means may thus be beneficial to specify.

Acknowledgment Based Pro's
1. With an acknowledgment on the PDCCH grant activating or deactivating the SPS allocation, the eNB may be able to distinguish from cases where the PDCCH is missed by the UE.
2. With a higher degree of robustness of the activation/deactivation mechanism, the eNB may not have to repeat unnecessarily the SPS grant.
3. A activation and deactivation acknowledgement mechanism may allow for less conservative use of preconfigured SPS resources and may allow decreased PDCCH load as lower aggregation level can be used.
4. An acknowledged activation/deactivation of the SPS grant resources may reduce DRX misalignment.

Acknowledgement Based Con's
1. Unnecessary UE battery consumption in instances of empty UE buffer at activation/deactivation;
2. DRX impacted by the additional UL transmission including the HARQ wait time (handling of inactivity timer/short cycle timer)
3. Increased uplink interference in instances where the SPS allocation is changed due to e.g. PDCCH activation/deactivation and where the UE buffer is empty.
4. New UE behaviour needed for deactivation/release acknowledgment.
5. DRX misalignment probability may be increased due to loss of ACK compared to if ACK is received correctly
6. SPS resources may be unused for a duration as a result of a missing ACK after successful PDCCH reception.

Acknowledgement Free Pro's
1. Relies on the legacy behaviour that the UE in the rare cases of PDCCH loss (e.g. 1%) and non-empty buffer may initiate a SR procedure (alt. RACH procedure). The eNB may then re-initialise SPS or allocate a dynamic grant for the UE to compensate the PDCCH loss.
2. No additional UL transmissions that may cause interference in instances where the SPS allocation is changed due to e.g. PDCCH activation/deactivation and the UE buffer is empty.
3. UE may go earlier to DRX
4. UE behaviour simplified and no new behaviour at deactivation is needed.

Acknowledgement Free Con's
1. Increased PDCCH aggregation level may need to be used which increases the PDCCH resource usage
2. SPS resources may be unused until a SR procedure has been initiated by the UE missing the PDCCH
3. SPS deactivation on PDCCH may need repetition to have robust SPS resource release
4. SPS resources are not released after release indication and are only detected at first periodic grant allocation opportunity after the release signalling time instance.

In the current 3GPP E-UTRA MAC specification (3GPP TS 36.321 v12.5.0), semi-persistent scheduling operates as follows:

5.10 Semi-Persistent Scheduling
When Semi-Persistent Scheduling is enabled by RRC, the following information is provided [8]:
  Semi-Persistent Scheduling C-RNTI;
  Uplink Semi-Persistent Scheduling interval semiPersistSchedIntervalUL and number of empty transmissions before implicit release implicitReleaseAfter, if Semi-Persistent Scheduling is enabled for the uplink;
  Whether twointervalsConfig is enabled or disabled for uplink, only for TDD;
  Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink;

When Semi-Persistent Scheduling for uplink or downlink is disabled by RRC, the corresponding configured grant or configured assignment shall be discarded.

Semi-Persistent Scheduling is supported on the SpCell only.
Semi-Persistent Scheduling is not supported for RN communication with the E-UTRAN in combination with an RN subframe configuration.

NOTE: When eIMTA is configured for the SpCell, if a configured uplink grant or a configured downlink assignment occurs on a subframe that can be reconfigured through eIMTA L1 signalling, then the UE behaviour is left unspecified.

5.10.1 Downlink
After a Semi-Persistent downlink assignment is configured, the MAC entity shall consider sequentially that the $N^{th}$ assignment occurs in the subframe for which:

$$(10*SFN+\text{subframe}) = [(10*SFN_{start\ time} + \text{subframe}_{start\ time}) + N*\text{semiPersistSchedIntervalDL}] \text{ modulo } 10240.$$

Where $SFN_{start\ time}$ and $\text{subframe}_{start\ time}$ are the SFN and subframe, respectively, at the time the configured downlink assignment were (re-)initialised.

5.10.2 Uplink
After a Semi-Persistent Scheduling uplink grant is configured, the MAC entity shall:
  if twointervalsConfig is enabled by upper layer:
    set the Subframe_Offset according to Table 7.4-1.
  else:
    set Subframe_Offset to 0.
  consider sequentially that the $N^{th}$ grant occurs in the subframe for which:

$$(10*SFN+\text{subframe}) = [(10*SFN_{start\ time} + \text{subframe}_{start\ time}) + N*\text{semiPersistSchedIntervalUL} + \text{Subframe\_Offset}*(N \text{ modulo } 2)] \text{ modulo } 10240.$$

Where $SFN_{start\ time}$ and $\text{subframe}_{start\ time}$ are the SFN and subframe, respectively, at the time the configured uplink grant were (re-)initialised.

The MAC entity shall clear the configured uplink grant immediately after implicitReleaseAfter [8] number of consecutive new MAC PDUs each containing zero MAC SDUs have been provided by the Multiplexing and Assembly entity, on the Semi-Persistent Scheduling resource.

NOTE: Retransmissions for Semi-Persistent Scheduling can continue after clearing the configured uplink grant.

[ . . . ]

5.4.1 UL Grant Reception
In order to transmit on the UL-SCH the MAC entity must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

If the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI:

if an uplink grant for this TTI and this Serving Cell has been received on the PDCCH for the MAC entity's C-RNTI or Temporary C-RNTI; or
if an uplink grant for this TTI has been received in a Random Access Response:
  if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant:
    consider the NDI to have been toggled for the corresponding HARQ process regardless of the value of the NDI.
  deliver the uplink grant and the associated HARQ information to the HARQ entity for this TTI.
else, if this Serving Cell is the SpCell and if an uplink grant for this TTI has been received for the SpCell on the PDCCH of the SpCell for the MAC entity's Semi-Persistent Scheduling C-RNTI:
  if the NDI in the received HARQ information is 1:
    consider the NDI for the corresponding HARQ process not to have been toggled;
    deliver the uplink grant and the associated HARQ information to the HARQ entity for this TTI.
  else if the NDI in the received HARQ information is 0:
    if PDCCH contents indicate SPS release:
      clear the configured uplink grant (if any).
    else:
      store the uplink grant and the associated HARQ information as configured uplink grant;
      initialise (if not active) or re-initialise (if already active) the configured uplink grant to start in this TTI and to recur according to rules in subclause 5.10.2;
      consider the NDI bit for the corresponding HARQ process to have been toggled;
      deliver the configured uplink grant and the associated HARQ information to the HARQ entity for this TTI.
else, if this Serving Cell is the SpCell and an uplink grant for this TTI has been configured for the SpCell:
  consider the NDI bit for the corresponding HARQ process to have been toggled;
  deliver the configured uplink grant, and the associated HARQ information to the HARQ entity for this TTI.
NOTE: The period of configured uplink grants is expressed in TTIs.
NOTE: If the MAC entity receives both a grant in a Random Access Response and a grant for its C-RNTI or Semi persistent scheduling C-RNTI requiring transmissions on the SpCell in the same UL subframe, the MAC entity may choose to continue with either the grant for its RA-RNTI or the grant for its C-RNTI or Semi persistent scheduling C-RNTI.
NOTE: When a configured uplink grant is indicated during a measurement gap and indicates an UL-SCH transmission during a measurement gap, the MAC entity processes the grant but does not transmit on UL-SCH.
Details of UL HARQ operation can be found in 3GPP TS 36.321 v12.5.0 as follows:
5.4.2 HARQ Operation
5.4.2.1 HARQ Entity
There is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.
The number of parallel HARQ processes per HARQ entity is specified in [2], clause 8.
When the physical layer is configured for uplink spatial multiplexing [2], there are two HARQ processes associated with a given TTI. Otherwise there is one HARQ process associated with a given TTI.
At a given TTI, if an uplink grant is indicated for the TTI, the HARQ entity identifies the HARQ process(es) for which a transmission should take place. It also routes the received HARQ feedback (ACK/NACK information), MCS and resource, relayed by the physical layer, to the appropriate HARQ process(es).
When TTI bundling is configured, the parameter TTI_BUNDLE_SIZE provides the number of TTIs of a TTI bundle. TTI bundling operation relies on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e the TTI corresponding to TTI_BUNDLE_SIZE), regardless of whether a transmission in that TTI takes place or not (e.g. when a measurement gap occurs). A retransmission of a TTI bundle is also a TTI bundle. TTI bundling is not supported when the MAC entity is configured with one or more SCells with configured uplink.
TTI bundling is not supported for RN communication with the E-UTRAN in combination with an RN subframe configuration.
For transmission of Msg3 during Random Access (see subclause 5.1.5) TTI bundling does not apply.
For each TTI, the HARQ entity shall:
  identify the HARQ process(es) associated with this TTI, and for each identified HARQ process:
    if an uplink grant has been indicated for this process and this TTI:
      if the received grant was not addressed to a Temporary C-RNTI on PDCCH and if the NDI provided in the associated HARQ information has been toggled compared to the value in the previous transmission of this HARQ process; or
      if the uplink grant was received on PDCCH for the C-RNTI and the HARQ buffer of the identified process is empty; or
      if the uplink grant was received in a Random Access Response:
        if there is a MAC PDU in the Msg3 buffer and the uplink grant was received in a Random Access Response:
          obtain the MAC PDU to transmit from the Msg3 buffer.
        else:
          obtain the MAC PDU to transmit from the "Multiplexing and assembly" entity;
        deliver the MAC PDU and the uplink grant and the HARQ information to the identified HARQ process;
        instruct the identified HARQ process to trigger a new transmission.
      else:
        deliver the uplink grant and the HARQ information (redundancy version) to the identified HARQ process;

instruct the identified HARQ process to generate an adaptive retransmission.
else, if the HARQ buffer of this HARQ process is not empty:
instruct the identified HARQ process to generate a non-adaptive retransmission.

When determining if NDI has been toggled compared to the value in the previous transmission the MAC entity shall ignore NDI received in all uplink grants on PDCCH for its Temporary C-RNTI.

5.4.2.2 HARQ Process

Each HARQ process is associated with a HARQ buffer.

Each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.

The sequence of redundancy versions is 0, 2, 3, 1. The variable CURRENT_IRV is an index into the sequence of redundancy versions. This variable is up-dated modulo 4.

New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt.

The MAC entity is configured with a Maximum number of HARQ transmissions and a Maximum number of Msg3 HARQ transmissions by RRC: maxHARQ-Tx and maxHARQ-Msg3Tx respectively. For transmissions on all HARQ processes and all logical channels except for transmission of a MAC PDU stored in the Msg3 buffer, the maximum number of transmissions shall be set to maxHARQ-Tx. For transmission of a MAC PDU stored in the Msg3 buffer, the maximum number of transmissions shall be set to maxHARQ-Msg3Tx.

When the HARQ feedback is received for this TB, the HARQ process shall:
set HARQ_FEEDBACK to the received value.

If the HARQ entity requests a new transmission, the HARQ process shall:
set CURRENT_TX_NB to 0;
set CURRENT_IRV to 0;
store the MAC PDU in the associated HARQ buffer;
store the uplink grant received from the HARQ entity;
set HARQ_FEEDBACK to NACK;
generate a transmission as described below.

If the HARQ entity requests a retransmission, the HARQ process shall:
increment CURRENT_TX_NB by 1;
if the HARQ entity requests an adaptive retransmission:
store the uplink grant received from the HARQ entity;
set CURRENT_IRV to the index corresponding to the redundancy version value provided in the HARQ information;
set HARQ_FEEDBACK to NACK;
generate a transmission as described below.
else if the HARQ entity requests a non-adaptive retransmission:
if HARQ_FEEDBACK=NACK:
generate a transmission as described below.
NOTE: When receiving a HARQ ACK alone, the MAC entity keeps the data in the HARQ buffer.
NOTE: When no UL-SCH transmission can be made due to the occurrence of a measurement gap, no HARQ feedback can be received and a non-adaptive retransmission follows.

To generate a transmission, the HARQ process shall:
if the MAC PDU was obtained from the Msg3 buffer; or
if Sidelink Discovery Gaps for Transmission are not configured by upper layers, and there is no measurement gap at the time of the transmission and, in case of retransmission, the retransmission does not collide with a transmission for a MAC PDU obtained from the Msg3 buffer in this TTI; or
if Sidelink Discovery Gaps for Transmission are configured by upper layers, and there is no measurement gap at the time of the transmission and, in case of retransmission, the retransmission does not collide with a transmission for a MAC PDU obtained from the Msg3 buffer, and there is no Sidelink Discovery Gap for Transmission in this TTI; or
if Sidelink Discovery Gaps for Transmission are configured by upper layers, and there is no measurement gap at the time of the transmission and, in case of retransmission, the retransmission does not collide with a transmission for a MAC PDU obtained from the Msg3 buffer, and there is a Sidelink Discovery Gap for Transmission, and there is no configured grant for transmission on SL-DCH in this TTI:
instruct the physical layer to generate a transmission according to the stored uplink grant with the redundancy version corresponding to the CURRENT_IRV value;
increment CURRENT_IRV by 1;
if there is a measurement gap or Sidelink Discovery Gap for Reception at the time of the HARQ feedback reception for this transmission and if the MAC PDU was not obtained from the Msg3 buffer:
set HARQ_FEEDBACK to ACK at the time of the HARQ feedback reception for this transmission.

After performing above actions, the HARQ process then shall:
if CURRENT_TX_NB=maximum number of transmissions−1:
flush the HARQ buffer;

In the current 3GPP E-UTRA RRC specification (3GPP TS 36.331 v12.5.0), semi-persistent scheduling is configured as follows:
SPS-Config
The IE SPS-Config is used to specify the semi-persistent scheduling configuration.

SPS-Config Information Element

```
-- ASN1START
SPS-Config ::= SEQUENCE {
    semiPersistSchedC-RNTI    C-RNTI          OPTIONAL,    -- Need OR
    sps-ConfigDL              SPS-ConfigDL    OPTIONAL,    -- Need ON
    sps-ConfigUL              SPS-ConfigUL    OPTIONAL     -- Need ON
}
```

```
SDS-ConfigDL ::= CHOICE{
    release                         NULL,
    setup                           SEQUENCE {
        semiPersistSchedIntervalDL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        numberofConfSPS-Processes       INTEGER (1..8),
        n1PUCCH-AN-PersistentList       N1PUCCH-AN-PersistentList,
        ...,
        [[ twoAntennaPortActivated-r10  CHOICE {
            release                         NULL,
            setup                           SEQUENCE {
                n1PUCCH-AN-PersistentListP1-r10 N1PUCCH-AN-PersistentList
            }
        }                                                       OPTIONAL    -- Need
ON
        ]]
    }
}
SPS-ConfigUL ::= CHOICE {
    release                         NULL,
    setup                           SEQUENCE {
        semiPersistSchedIntervalUL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }   OPTIONAL,                                -- Need OP
        twoIntervalsConfig              ENUMERATED {true}   OPTIONAL,        -- Cond TDD
        ...,
        [[ p0-PersistentSubframeSet2-r12    CHOICE {
            release                             NULL,
            setup                               SEQUENCE {
                p0-NominalPUSCH-PersistentSubframeSet2-r12      INTEGER (-126..24),
                p0-UE-PUSCH-PersistentSubframeSet2-r12          INTEGER (-8..7)
            }
        }                                                       OPTIONAL    -- Need ON
        ]]
    }
}
N1PUCCH-AN-PersistentList ::= SEQUENCE (SIZE (1..4)) OF INTEGER (0..2047)
-- ASN1STOP
```

| SPS-Config field descriptions |
|---|
| implicitReleaseAfter |
| Number of empty transmissions before implicit release, see TS 36.321 [6, 5.10.2]. Value e2 corresponds to 2 transmissions, e3 corresponds to 3 transmissions and so on. |
| n1PUCCH-AN-PersistentList, n1PUCCH-AN-PersistentListP1 |
| List of parameter: $n_{PUCCH}^{(1, p)}$ for antenna port P0 and for antenna port P1 respectively, see TS 36.213 [23, 10.1]. Field n1-PUCCH-AN-PersistentListP1 is applicable only if the twoAntennaPortActivatedPUCCH-Format1a1b in PUCCH-ConfigDedicated-v1020 is set to true. Otherwise the field is not configured. |
| numberOfConfSPS-Processes |
| The number of configured HARQ processes for Semi-Persistent Scheduling, see TS 36.321 [6]. |
| p0-NominalPUSCH-Persistent |
| Parameter: $P_{O\_NOMINAL\_PUSCH}$ (0). See TS 36.213 [23, 5.1.1.1], unit dBm step 1. This field is applicable for persistent scheduling, only. If choice setup is used and p0-Persistent is absent, apply the value of p0-NominalPUSCH for |

| SPS-Config field descriptions |
|---|
| p0-NominalPUSCH-Persistent. If uplink power control subframe sets are configured by tpc-SubframeSet, this field applies for uplink power control subframe set 1. |
| p0-NominalPUSCH-PersistentSubframeSet2 |
| Parameter: $P_{O\_NOMINAL\_PUSCH}$ (0). See TS 36.213 [23, 5.1.1.1], unit dBm step 1. This field is applicable for persistent scheduling, only. If p0-PersistentSubframeSet2-r12 is not configured, apply the value of p0-NominalPUSCH-SubframeSet2-r12 for p0-NominalPUSCH-PersistentSubframeSet2. E-UTRAN configures this field only if uplink power control subframe sets are configured by tpc-SubframeSet, in which case this field applies for uplink power control subframe set 2. |
| p0-UE-PUSCH-Persistent |
| Parameter: $P_{O\_UE\_PUSCH}$ (0). See TS 36.213 [23, 5.1.1.1], unit dB. This field is applicable for persistent scheduling, only. If choice setup is used and p0-Persistent is absent, apply the value of p0-UE-PUSCH for p0-UE-PUSCH-Persistent. If uplink power control subframe sets are configured by tpc-SubframeSet, this field applies for uplink power control subframe set 1. |

| SPS-Config field descriptions |
| --- |
| p0-UE-PUSCH-PersistentSubframeSet2 |
| Parameter: $P_{O\_UE\_PUSCH}$ (0). See TS 36.213 [23, 5.1.1.1], unit dB. This field is applicable for persistent scheduling, only. If p0-PersistentSubframeSet2-r12 is not configured, apply the value of p0-UE-PUSCH-SubframeSet2 for p0-UE-PUSCH-PersistentSubframeSet2. E-UTRAN configures this field only if uplink power control subframe sets are configured by tpc-SubframeSet, in which case this field applies for uplink power control subframe set 2. |
| semiPersistSchedC-RNTI |
| Semi-persistent Scheduling C-RNTI, see TS 36.321 [6]. |
| semiPersistSchedIntervalDL |
| Semi-persistent scheduling interval in downlink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames. |
| semiPersistSchedIntervalUL |
| Semi-persistent scheduling interval in uplink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames. |
| twoIntervalsConfig |
| Trigger of two-intervals-Semi-Persistent Scheduling in uplink. See TS 36.321 [6, 5.10]. If this field is present, two-intervals-SPS is enabled for uplink. Otherwise, two-intervals-SPS is disabled. |

| Conditional presence | Explanation |
| --- | --- |
| TDD | This field is optional present for TDD, need OR; it is not present for FDD and the UE shall delete any existing value for this field. |

Some UEs are capable of transmitting PUSCH (Physical Uplink Shared Channel) and PUCCH (Physical Uplink Control Channel) simultaneously, and some UEs are not capable of transmitting PUSCH and PUCCH simultaneously. Such capability would be reported to eNB (evolved Node B) so that eNB could decide whether to configure this functionality or not. Even if UE support this feature, eNB may decide not to configure this function if the channel condition of the UE is poor, as to transmit both channel simultaneously is more power consuming. In such case, the UE maximum transmission power may not guarantee proper power level for each channel. UE may decide which channel to transmit UCI (Uplink Control Information) with depending on whether PUSCH and PUCCH simultaneously is configured or not.

Section 10.1 of 3GPP 36.213 v12.5.0 states:
10.1 UE Procedure for Determining Physical Uplink Control Channel Assignment
If the UE is configured for a single serving cell and is not configured for simultaneous PUSCH and PUCCH transmissions, then in subframe n uplink control information (UCI) shall be transmitted
  on PUCCH using format 1/1a/1b/3 or 2/2a/2b if the UE is not transmitting PUSCH
  on PUSCH if the UE is transmitting PUSCH in subframe n unless the PUSCH transmission corresponds to a Random Access Response Grant or a retransmission of the same transport block as part of the contention based random access procedure, in which case UCI is not transmitted If the UE is configured for a single serving cell and simultaneous PUSCH and PUCCH transmission, then in subframe n UCI shall be transmitted
  on PUCCH using format 1/1a/1b/3 if the UCI consists only of HARQ-ACK and/or SR
  on PUCCH using format 2 if the UCI consists only of periodic CSI
  on PUCCH using format 2/2a/2b/3 if the UCI consists of periodic CSI and HARQ-ACK and if the UE is not transmitting PUSCH
  on PUCCH and PUSCH if the UCI consists of HARQ-ACK/HARQ-ACK+SR/positive SR and periodic/aperiodic CSI and if the UE is transmitting PUSCH in subframe n, in which case the HARQ-ACK/HARQ-ACK+SR/positive SR is transmitted on PUCCH using format 1/1a/1b/3 and the periodic/aperiodic CSI transmitted on PUSCH unless the PUSCH transmission corresponds to a Random Access Response Grant or a retransmission of the same transport block as part of the contention based random access procedure, in which case periodic/aperiodic CSI is not transmitted For a UE with poor channel condition, such as in cell edge, it is possible to configure HARQ-ACK (Hybrid Automatic Repeat Request Acknowledgement) repetition to improve the HARQ-ACK feedback reliability by repeating the transmission of ACK/NACK (Acknowledgement/Negative Acknowledgement) multiple times. Under such situation, the HARQ-ACK would be transmitted on PUCCH without multiplexed onto other channel, e.g., PUSCH, to enjoy the combining gain of repetition across subframes, as some of the repetitions would occur on the same resource and joint demodulation/channel estimation is possible.

Section 10.2 of 3GPP 36.213 v12.5.0 states:
10.2 Uplink HARQ-ACK Timing
For TDD or for FDD-TDD and primary cell frame structure type 2 or for FDD-TDD and primary cell frame structure type 1, if a UE configured with EIMTA-MainConfigServCell-r12 for a serving cell, "UL/DL configuration" of the serving cell in subclause 10.2 refers to the UL/DL configuration given by the parameter eimta-HARQ-ReferenceConfig-r12 for the serving cell unless specified otherwise.

For FDD or for FDD-TDD and primary cell frame structure type 1, the UE shall upon detection of a PDSCH transmission in subframe n−4 intended for the UE and for which an HARQ-ACK shall be provided, transmit the HARQ-ACK response in subframe n. If HARQ-ACK repetition is enabled, upon detection of a PDSCH transmission in subframe n−4 intended for the UE and for which HARQ-ACK response shall be provided, and if the UE is not repeating the transmission of any HARQ-ACK in subframe n corresponding to a PDSCH transmission in subframes n−$N_{ANRep}$−3, . . . , n−5, the UE:
  shall transmit only the HARQ-ACK response (corresponding to the detected PDSCH transmission in subframe n−4) on PUCCH in subframes n, n+1, . . . , n+$N_{ANRep}$−1;
  shall not transmit any other signal/channel in subframes n, n+1, . . . , n+$N_{ANRep}$−1; and
  shall not transmit any HARQ-ACK response repetitions corresponding to any detected PDSCH transmission in subframes n−3, . . . , n+$N_{ANRep}$−5.
  < . . . >

For TDD, if HARQ-ACK repetition is enabled, upon detection of a PDSCH transmission within subframe(s) n−k, where $k \in K$ and $K$ is defined in Table 10.1.3.1-1 intended for the UE and for which HARQ-ACK response shall be provided, and if the UE is not repeating the transmission of any HARQ-ACK in subframe n corresponding to a PDSCH transmission in a downlink or special subframe earlier than subframe n–k, the UE:

- shall transmit only the HARQ-ACK response (corresponding to the detected PDSCH transmission in subframe n–k) on PUCCH in UL subframe n and the next $N_{ANRep}-1$ UL subframes denoted as $n_1, \ldots, n_{N_{ANRep}-1}$;
- shall not transmit any other signal/channel in UL subframe n, $n_1, \ldots, n_{N_{ANRep}-1}$; and
- shall not transmit any HARQ-ACK response repetitions corresponding to any detected PDSCH transmission in subframes $n_i$–k, where $k \in K_i$, $K_i$ is the set defined in Table 10.1.3.1-1 corresponding to UL subframe $n_i$, and $1 \leq i \leq N_{ANRep}-1$.

3GPP TS 36.212 v13.0.0 describes how physical layer process a transport block from MAC layer and how to multiplex uplink control information as follows:

5.2 Uplink Transport Channels and Control Information

If the UE is configured with a Master Cell Group (MCG) and Secondary Cell Group (SCG) [6], the procedures described in this clause are applied to the MCG and SCG, respectively. When the procedures are applied to a SCG, the term primary cell refers to the primary SCell (PSCell) of the SCG.

If the UE is configured with a PUCCH SCell [6], the procedures described in this clause are applied to the group of DL cells associated with the primary cell and the group of DL cells associated with the PUCCH SCell, respectively. When the procedures are applied to the group of DL cells associated with the PUCCH SCell, the term primary cell refers to the PUCCH SCell.

If the UE is configured with a LAA SCell, the procedures described in this clause are applied assuming the LAA SCell is an FDD SCell.

5.2.1 Random Access Channel

The sequence index for the random access channel is received from higher layers and is processed according to [2].

5.2.2 Uplink Shared Channel

Figure 5.2.2-1 shows the processing structure for the UL-SCH transport channel on one UL cell. Data arrives to the coding unit in the form of a maximum of two transport blocks every transmission time interval (TTI) per UL cell. The following coding steps can be identified for each transport block of an UL cell:

- Add CRC to the transport block
- Code block segmentation and code block CRC attachment
- Channel coding of data and control information
- Rate matching
- Code block concatenation
- Multiplexing of data and control information
- Channel interleaver The coding steps for one UL-SCH transport block are shown in the figure below. The same general processing applies for each UL-SCH transport block on each UL cell with restrictions as specified in [3].

Figure 6:
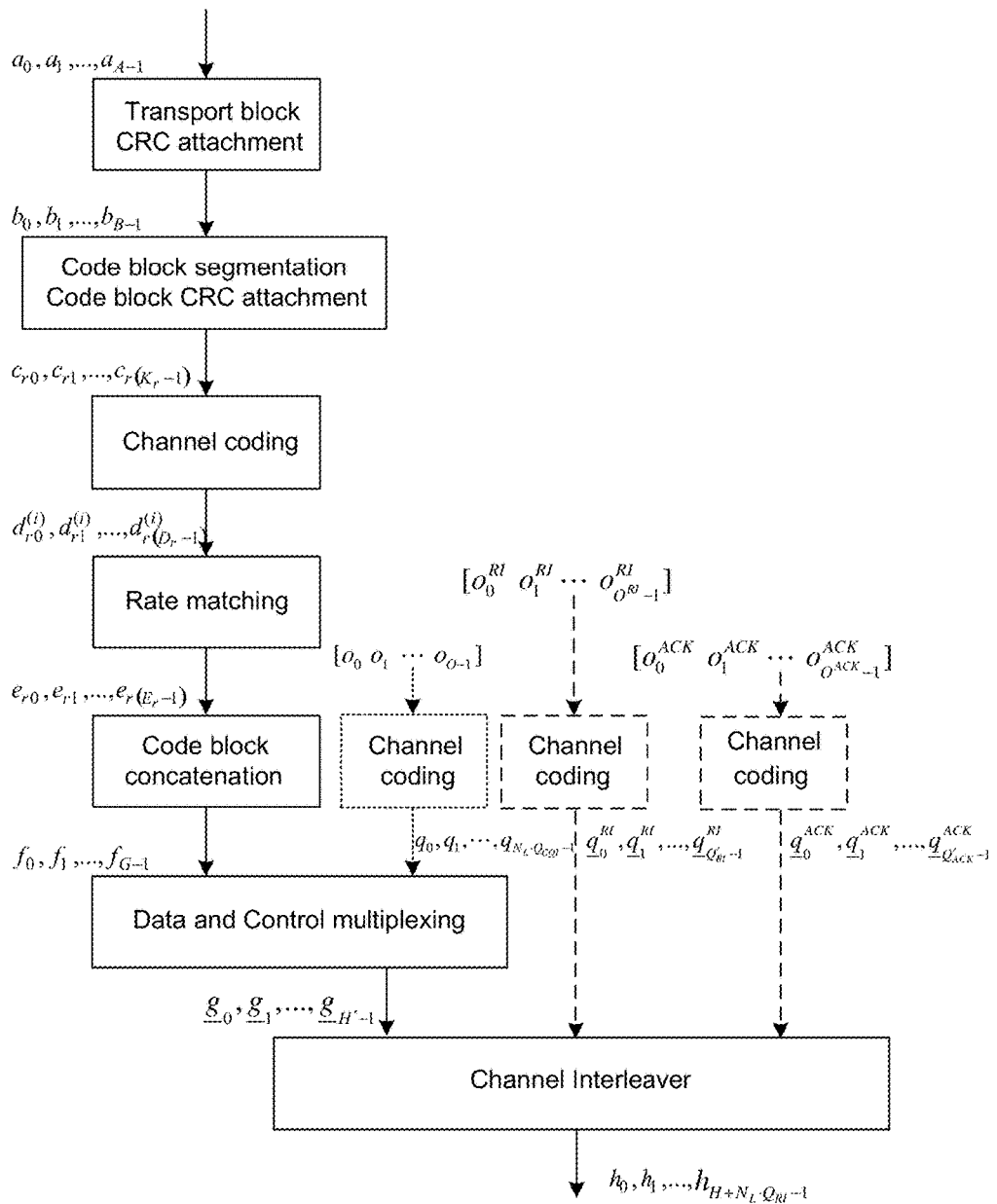
FIG. 6 is a reproduction of FIG. 5.2.2-1 of 3GPP TS 36.212 v13.0.0.

[Figure 5.2.2-1 of 3GPP TS 36.212 v13.0.0, Entitled "Transport Block Processing for UL-SCH" is Reproduced as FIG. 6]

5.2.2.1 Transport Block CRC Attachment

Error detection is provided on each UL-SCH transport block through a Cyclic Redundancy Check (CRC).

The entire transport block is used to calculate the CRC parity bits. Denote the bits in a transport block delivered to layer 1 by $a_0, a_1, a_2, a_3, \ldots, a_{A-1}$, and the parity bits by $p_0, p_1, p_2, p_3, \ldots, p_{L-1}$, A is the size of the transport block and L is the number of parity bits. The lowest order information bit $a_0$ is mapped to the most significant bit of the transport block as defined in section 6.1.1 of [5].

The parity bits are computed and attached to the UL-SCH transport block according to section 5.1.1 setting L to 24 bits and using the generator polynomial $g_{CRC24A}(D)$.

5.2.2.2 Code Block Segmentation and Code Block CRC Attachment

The bits input to the code block segmentation are denoted by $b_0, b_1, b_2, b_3, \ldots, b_{B-1}$ where B is the number of bits in the transport block (including CRC).

Code block segmentation and code block CRC attachment are performed according to section 5.1.2.

The bits after code block segmentation are denoted by $c_{r0}, c_{r1}, c_{r2}, c_{r3}, \ldots, c_{r(K_r-1)}$, where r is the code block number and $K_r$ is the number of bits for code block number r.

5.2.2.3 Channel Coding of UL-SCH

Code blocks are delivered to the channel coding block. The bits in a code block are denoted by $c_{r0}, c_{r1}, c_{r2}, c_{r3}, \ldots, c_{r(K_r-1)}$, where r is the code block number, and $K_r$ is the number of bits in code block number r. The total number of code blocks is denoted by C and each code block is individually turbo encoded according to section 5.1.3.2.

After encoding the bits are denoted by $d_{r0}^{(i)}, d_{r1}^{(i)}, d_{r2}^{(i)}, d_{r3}^{(i)}, \ldots, d_{r(D_r-1)}^{(i)}$, with i=0, 1, and 2 and where $D_r$ is the number of bits on the i-th coded stream for code block number r, i.e. $D_r = K_r + 4$.

5.2.2.4 Rate Matching

Turbo coded blocks are delivered to the rate matching block. They are denoted by $d_{r0}^{(i)}, d_{r1}^{(i)}, d_{r2}^{(i)}, d_{r3}^{(i)}, \ldots, d_{r(D_r-1)}^{(i)}$, with i=0, 1, and 2, and where r is the code block number, i is the coded stream index, and $D_r$ is the number of bits in each coded stream of code block number r. The total number of code blocks is denoted by C and each coded block is individually rate matched according to section 5.1.4.1.

After rate matching, the bits are denoted by $e_{r0}, e_{r1}, e_{r2}, e_{r3}, \ldots, e_{r(E_r-1)}$, where r is the coded block number, and where $E_r$ is the number of rate matched bits for code block number r.

5.2.2.5 Code Block Concatenation

The bits input to the code block concatenation block are denoted by $e_{r0}, e_{r1}, e_{r2}, e_{r3}, \ldots, e_{r(E_r-1)}$ for r=0, \ldots, C–1 and where $E_r$ is the number of rate matched bits for the r-th code block.

Code block concatenation is performed according to section 5.1.5.

The bits after code block concatenation are denoted by $f_0, f_1, f_2, f_3, \ldots, f_{G-1}$, where G is the total number of coded bits for transmission of the given transport block over $N_L$ transmission layers excluding the bits used for control transmission, when control information is multiplexed with the UL-SCH transmission.

5.2.2.6 Channel Coding of Control Information

Control data arrives at the coding unit in the form of channel quality information (CQI and/or PMI), HARQ-ACK and rank indication, and CSI-RS resource indication (CRI). Different coding rates for the control information are achieved by allocating different number of coded symbols for its transmission. When control data are transmitted in the PUSCH, the channel coding for HARQ-ACK, rank indication, CRI and channel quality information $o_0, o_1, o_2, \ldots, o_{O-1}$ is done independently.

For the cases with TDD primary cell, the number of HARQ-ACK bits is determined as described in section 7.3 of [3].

When the UE transmits HARQ-ACK bits, rank indicator bits or CRI bits, it shall determine the number of coded modulation symbols per layer Q' for HARQ-ACK, rank indicator or CRI bits as follows.

For the case when only one transport block is transmitted in the PUSCH conveying the HARQ-ACK bits, rank indicator bits or CRI bits:

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right)$$

where
- O is the number of HARQ-ACK bits, rank indicator bits or CRI bits, and
- $M_{sc}^{PUSCH}$ is the scheduled bandwidth for PUSCH transmission in the current sub-frame for the transport block, expressed as a number of subcarriers in [2], and
- $N_{symb}^{PUSCH\text{-}initial}$ is the number of SC-FDMA symbols per subframe for initial PUSCH transmission for the same transport block, respectively, given by $N_{symb}^{PUSCH\text{-}initial} = (2 \cdot (N_{symb}^{UL} - 1) - N_{SRS})$, where $N_{SRS}$ is equal to 1
    - if UE configured with one UL cell is configured to send PUSCH and SRS in the same subframe for initial transmission, or
    - if UE transmits PUSCH and SRS in the same subframe in the same serving cell for initial transmission, or
    - if the PUSCH resource allocation for initial transmission even partially overlaps with the cell-specific SRS subframe and bandwidth configuration defined in section 5.5.3 of [2], or
    - if the subframe for initial transmission in the same serving cell is a UE-specific type-1 SRS subframe as defined in Section 8.2 of [3], or
    - if the subframe for initial transmission in the same serving cell is a UE-specific type-0 SRS subframe as defined in section 8.2 of [3] and the UE is configured with multiple TAGs.

Otherwise $N_{SRS}$ is equal to 0.

$M_{sc}^{PUSCH\text{-}initial}$, C, and $K_r$ are obtained from the initial PDCCH or EPDCCH for the same transport block. If there is no initial PDCCH or EPDCCH with DCI format 0 for the same transport block, $M_{sc}^{PUSCH\text{-}initial}$, C, and $K_r$ shall be determined from:
- the most recent semi-persistent scheduling assignment PDCCH or EPDCCH, when the initial PUSCH for the same transport block is semi-persistently scheduled, or
- the random access response grant for the same transport block, when the PUSCH is initiated by the random access response grant.

For the case when two transport blocks are transmitted in the PUSCH conveying the HARQ-ACK bits, rank indicator bits or CRI bits:

where
- O is the number of HARQ-ACK bits, rank indicator bits or CRI bits, and
- $Q'_{min} = O$ if $O \le 2$, $Q'_{min} = \lceil 2O/Q'_m \rceil$ if $3 \le O \le 11$ with $Q'_{min}(Q_m^1, Q_m^2)$ where $Q_m^x$, $x=\{1,2\}$ is the modulation order of transport block "x", and $Q'_{min} = \lceil 2O_1/Q'_m \rceil + \lceil 2O_2/Q'_m \rceil$ if $O > 11$ with $O_1 = \lceil O/2 \rceil$ and $O_2 = O - \lceil O/2 \rceil$.
- $M_{sc}^{PUSCH\text{-}initial(x)}$, $x=\{1,2\}$ are the scheduled bandwidths for PUSCH transmission in the initial sub-frame for the first and second transport block, respectively, expressed as a number of subcarriers in [2], and
- $N_{symb}^{PUSCH\text{-}initial(x)}$, $x=\{1,2\}$ are the number of SC-FDMA symbols per subframe for initial PUSCH transmission for the first and second transport block given by $N_{symb}^{PUSCH\text{-}initial(x)} = (2 \cdot (N_{symb}^{UL} - 1) - N_{SRS}^{(x)})$, $x=\{1,2\}$, where
    - $N_{SRS}^{(x)}$, $x=\{1,2\}$ is equal to 1
        - if UE configured with one UL cell is configured to send PUSCH and SRS in the same subframe for initial transmission, or
        - if UE transmits PUSCH and SRS in the same subframe in the same serving cell for initial transmission of transport block "x", or
        - if the PUSCH resource allocation for initial transmission of transport bock "x" even partially overlaps with the cell-specific SRS subframe and bandwidth configuration defined in section 5.5.3 of [2], or
        - if the subframe for initial transmission of transport block "x" in the same serving cell is a UE-specific type-1 SRS subframe as defined in Section 8.2 of [3], or
        - if the subframe for initial transmission of transport block "x" in the same serving cell is a UE-specific type-0 SRS subframe as defined in section 8.2 of [3] and the UE is configured with multiple TAGs.

Otherwise $N_{SRS}^{(x)}$, $x=\{1,2\}$ is equal to 0.

$M_{sc}^{PUSCH\text{-}initial(x)}$, $x=\{1,2\}$, $C^{(x)}$, $x=\{1,2\}$, and $K_r^{(x)}$, $x=\{1,2\}$ are obtained from the initial PDCCH or EPDCCH for the corresponding transport block.

For HARQ-ACK, $Q_{ACK} = Q_m \cdot Q'$ and $\beta_{offset}^{PUSCH} = \beta_{offset}^{HARQ\text{-}ACK}$, where $Q_m$ is the modulation order of a given transport block. For UEs configured with no more than five DL cells, $\beta_{offset}^{HARQ\text{-}ACK}$ shall be determined according to [3] depending on the number of transmission codewords for the corresponding PUSCH. For UEs configured with more than five DL cells, $\beta_{offset}^{HARQ\text{-}ACK}$ shall be determined according to [3] depending on the number of transmission codewords for the corresponding PUSCH and the number of HARQ-ACK feedback bits.

$$Q' = \max[\min(Q'_{temp}, 4 \cdot M_{sc}^{PUSCH}), Q'_{min}] \text{ with}$$

$$Q'_{temp} = \left\lceil \frac{O \cdot M_{sc}^{PUSCH\text{-}initial(1)} \cdot N_{symb}^{PUSCH\text{-}initial(1)} \cdot M_{sc}^{PUSCH\text{-}initial(2)} \cdot N_{symb}^{PUSCH\text{-}initial(2)} \cdot \beta_{offset}^{PUSCH}}{\sum_{r=0}^{C^{(1)}-1} K_r^{(1)} \cdot M_{sc}^{PUSCH\text{-}initial(2)} \cdot N_{symb}^{PUSCH\text{-}initial(2)} + \sum_{r=0}^{C^{(2)}-1} K_r^{(2)} \cdot M_{sc}^{PUSCH\text{-}initial(1)} \cdot N_{symb}^{PUSCH\text{-}initial(1)}} \right\rceil$$

For rank indication or CRI, $Q_{RI} = Q_m \cdot Q'$, $Q_{CRI} = Q_m \cdot Q'$ and $\beta_{offset}^{PUSCH} = \beta_{offset}^{RI}$, where $Q_m$ is the modulation order of a given transport block, and $\beta_{offset}^{RI}$ shall be determined according to [3] depending on the number of transmission codewords for the corresponding PUSCH, and on the uplink power control subframe set for the corresponding PUSCH when two uplink power control subframe sets are configured by higher layers for the cell.

For HARQ-ACK

Each positive acknowledgement (ACK) is encoded as a binary '1' and each negative acknowledgement (NACK) is encoded as a binary '0'

If HARQ-ACK feedback consists of 1-bit of information, i.e., $[o_0^{ACK}]$, it is first encoded according to Table 5.2.2.6-1.

If HARQ-ACK feedback consists of 2-bits of information, i.e., $[o_0^{ACK} \; o_1^{ACK}]$ with $o_0^{ACK}$ corresponding to HARQ-ACK bit for codeword 0 and or $o_1^{ACK}$ corresponding to that for codeword 1, or if HARQ-ACK feedback consists of 2-bits of information as a result of the aggregation of HARQ-ACK bits corresponding to two DL cells with which the UE is configured by higher layers, or if HARQ-ACK feedback consists of 2-bits of information corresponding to two subframes for TDD, it is first encoded according to Table 5.2.2.6-2 where $o_2^{ACK} = (o_0^{ACK} + o_1^{ACK}) \bmod 2$.

[Table 5.2.2.6-1 of 3GPP TS 36.212 v13.0.0, Entitled "Encoding of 1-Bit HARQ-ACK", is Reproduced as FIG. 7]

[Table 5.2.2.6-2 of 3GPP TS 36.212 v13.0.0, Entitled "Encoding of 2-Bit HARQ-ACK", is Reproduced as FIG. 8]

If HARQ-ACK feedback consists of $3 \leq O^{ACK} \leq 11$ bits of information as a result of the aggregation of HARQ-ACK bits corresponding to one or more DL cells with which the UE is configured by higher layers, i.e., $o_0^{ACK}$, $o_1^{ACK}$, ..., $o_{O^{ACK}-1}^{ACK}$, then a coded bit sequence $\tilde{q}_0^{ACK} \, \tilde{q}_1^{ACK}, \ldots, \tilde{q}_{31}^{ACK}$ is obtained by using the bit sequence $o_0^{ACK} \, o_1^{ACK}, \ldots, o_{O^{ACK}-1}^{ACK}$ as the input to the channel coding block described in section 5.2.2.6.4. In turn, the bit sequence $q_0^{ACK}, q_1^{ACK}, q_2^{ACK}, \ldots, q_{Q_{ACK}-1}^{ACK}$ is obtained by the circular repetition of the bit sequence $\tilde{q}_0^{ACK} \, \tilde{q}_1^{ACK}, \ldots, \tilde{q}_{31}^{ACK}$ so that the total bit sequence length is equal to $Q_{ACK}$.

If HARQ-ACK feedback consists of $11 < O^{ACK} \leq 22$ bits of information as a result of the aggregation of HARQ-ACK bits corresponding to one or more DL cells with which the UE is configured by higher layers, i.e., $o_0^{ACK}$, $o_1^{ACK}, \ldots, o_{O^{ACK}-1}^{ACK}$, then the coded bit sequence $q_0^{ACK}, q_1^{ACK}, q_2^{ACK}, \ldots, q_{Q_{ACK}-1}^{ACK}$ is obtained by using the bit sequence $o_0^{ACK} \, o_1^{ACK}, \ldots, o_{O^{ACK}-1}^{ACK}$ as the input to the channel coding block described in section 5.2.2.6.5.

If HARQ-ACK feedback consists of $O^{ACK} > 22$ bits of information as a result of the aggregation of HARQ-ACK bits corresponding to one or more DL cells with which the UE is configured by higher layers, the coded bit sequence is denoted by $q_0^{ACK}, q_1^{ACK}, q_2^{ACK}, \ldots, q_{Q_{ACK}-1}^{ACK}$. The CRC attachment, channel coding and rate matching of the HARQ-ACK bits are performed according to sections 5.1.1 setting L to 8 bits, 5.1.3.1 and 5.1.4.2, respectively. The input bit sequence to the CRC attachment operation is $o_0^{ACK} \, o_1^{ACK}, \ldots, o_{O^{ACK}-1}^{ACK}$. The output bit sequence of the CRC attachment operation is the input bit sequence to the channel coding operation. The output bit sequence of the channel coding operation is the input bit sequence to the rate matching operation.

The "x" and "y" in Table 5.2.2.6-1 and 5.2.2.6-2 are placeholders for [2] to scramble the HARQ-ACK bits in a way that maximizes the Euclidean distance of the modulation symbols carrying HARQ-ACK information.

For FDD or TDD HARQ-ACK multiplexing or the aggregation of more than one DL cell including at least one cell using FDD and at least one cell using TDD when HARQ-ACK consists of one or two bits of information, the bit sequence $q_0^{ACK}, q_1^{ACK}, q_2^{ACK}, \ldots, q_{Q_{ACK}-1}^{ACK}$ is obtained by concatenation of multiple encoded HARQ-ACK blocks where $Q_{ACK}$ is the total number of coded bits for all the encoded HARQ-ACK blocks. The last concatenation of the encoded HARQ-ACK block may be partial so that the total bit sequence length is equal to $Q_{ACK}$.

For UEs configured by higher layers with codebooksizeDetermination-r13=0, the bit sequence $\tilde{o}_0^{ACK} \, \tilde{o}_1^{ACK}, \ldots, \tilde{o}_{O^{ACK}-1}^{ACK}$ is determined according to the Downlink Assignment Index (DAI) as in Table 5.3.3.1.1-2 and as defined in [3]. Otherwise, the bit sequence $\tilde{o}_0^{ACK} \, \tilde{o}_1^{ACK}, \ldots, \tilde{o}_{O^{ACK}-1}^{ACK}$ is determined as below.

For FDD when HARQ ACK consists of 2 or more bits of information as a result of the aggregation of more than one DL cell, the bit sequence $\tilde{o}_0^{ACK} \, \tilde{o}_1^{ACK}, \ldots, \tilde{o}_{O^{ACK}-1}^{ACK}$ is the result of the concatenation of HARQ-ACK bits for the multiple DL cells according to the following pseudo-code:

```
Set c = 0 - cell index: lower indices correspond to lower RRC indices of corresponding cell
Set j = 0 - HARQ-ACK bit index
Set N_cells^DL to the number of cells configured by higher layers for the UE
while C < N_cells^DL
    if transmission mode configured in cell c ∈ {1,2,5,6,7} - 1 bit HARQ-ACK feedback for this
cell
        õ_j^ACK = HARQ-ACK bit of this cell
        j = j + 1
    else
        if the UE is not configured with spatial bundling on PUSCH by higher layers
            õ_j^ACK = HARQ-ACK bit corresponding to the first codeword of this cell
            j = j + 1
            õ_j^ACK = HARQ-ACK bit corresponding to the second codeword of this cell
            j = j + 1
        else
            õ_j^ACK = binary AND operation of the HARQ-ACK bits corresponding to the first
            and second codewords of this cell
            j = j + 1
        end if
    end if
    c = c + 1
end while
```

For the aggregation of more than one DL cell including a primary cell using FDD and at least one secondary cell using TDD, the bit sequence $\tilde{o}_0^{ACK} \tilde{o}_1^{ACK}, \ldots, \tilde{o}_{O^{ACK}-1}^{ACK}$ is the result of the concatenation of HARQ-ACK bits for one or multiple DL cells. Define $N_{cells}^{DL}$ as the number of cells configured by higher layers for the UE and $B_c^{DL}$ as the number of subframes for which the UE needs to feed back HARQ-ACK bits in UL subframe n for the c-th serving cell. For a cell using TDD, the subframes are determined by the DL-reference UL/DL configuration if the UE is configured with higher layer parameter eimta-HARQ-ReferenceConfig, and determined by the UL/DL configuration otherwise. For a cell using TDD, $B_c^{DL}=1$ if subframe n−4 in the cell is a DL subframe or a special subframe with special subframe configurations 1/2/3/4/6/7/8/9 and normal downlink CP or a special subframe with special subframe configurations 1/2/3/5/6/7 and extended downlink CP, and $B_c^{DL}=0$ otherwise. For a cell using FDD, $B_c^{DL}=1$.

The bit sequence $\tilde{o}_0^{ACK} \tilde{o}_1^{ACK}, \ldots, \tilde{o}_{O^{ACK}-1}^{ACK}$ is performed according to the following pseudo-code:

```
Set c = 0 - cell index: lower indices correspond to lower RRC indices of corresponding cell
Set j = 0 - HARQ-ACK bit index
while c < N_cells^DL
    if B_c^DL = 1
        if transmission mode configured in cell c ∈ {1,2,5,6,7} - 1 bit HARQ-ACK feedback
        for this cell
            õ_j^ACK = HARQ-ACK bit of this cell
            j = j + 1
        else
            if the UE is not configured with spatial bundling on PUSCH by higher
            layers
                õ_j^ACK = HARQ-ACK bit corresponding to the first codeword of this
                cell
                j = j + 1
                õ_j^ACK = HARQ-ACK bit corresponding to the second codeword of
                this cell
                j = j + 1
            else
                õ_j^ACK = binary AND operation of the HARQ-ACK bits corresponding
                to the first and second codewords of this cell
                j = j + 1
            end if
        end if
    end if
    c = c + 1
end while
```

For the cases with TDD primary cell when HARQ-ACK is for the aggregation of one or more DL cells and the UE is configured with PUCCH format 3, PUCCH format 4 or PUCCH format 5 [3], the bit sequence $\tilde{o}_0^{ACK} \tilde{o}_1^{ACK}, \ldots, \tilde{o}_{O^{ACK}-1}^{ACK}$ is the result of the concatenation of HARQ-ACK bits for the one or more DL cells configured by higher layers and the multiple subframes as defined in [3]. Define $N_{cells}^{DL}$ as the number of cells configured by higher layers for the UE and $B_c^{DL}$ as the number of subframes for which the UE needs to feed back HARQ-ACK bits as defined in Section 7.3 of [3].

The number of HARQ-ACK bits for the UE to convey if it is configured with PUCCH format 3, PUCCH format 4 or PUCCH format 5 is computed as follows:

```
Set k = 0 - counter of HARQ-ACK bits
Set c=0 - cell index: lower indices correspond to lower RRC indices of corresponding cell
while c < N_cells^DL
    set l = 0;
    while l < B_c^DL
        if transmission mode configured in cell c ∈ {1,2,5,6,7} -- 1 bit HARQ-ACK feedback for this
        cell
            k = k + 1
        else
            k = k + 2
        end if
        l = l+1
    end while
    c = c + 1
end while
```

When PUCCH format 3 is configured, if k≤20 when TDD is used in all the configured serving cell(s) of the UE, or if k≤21 when FDD is used in at least one of the configured serving cells with TDD primary cell; or when PUCCH format 4 or PUCCH format 5 is configured and when the UE is not configured with spatial bundling on PUSCH by higher layers, the multiplexing of HARQ-ACK bits is performed according to the following pseudo-code:

```
Set c = 0 - cell index: lower indices correspond to lower RRC indices of corresponding cell
Set j = 0 - HARQ-ACK bit index
while c < N_cells^DL
    set l = 0;
    while l < B_c^DL
        if transmission mode configured in cell c ∈ {1,2,5,6,7} -- 1 bit HARQ-ACK feedback for this cell
            õ_j^ACK = o_{c,l}^ACK  HARQ-ACK bit of this cell as defined in Section 7.3 of [3]
            j = j + 1
        else
            [õ_j^ACK,õ_{j+1}^ACK] = [o_{c,2l}^ACK,o_{c,2l+1}^ACK]  HARQ-ACK bits of this cell as defined in Section 7.3 of [3]
            j = j + 2
        end if
        l = l+1
    end while
    c = c + 1
end while
```

When PUCCH format 3 is configured, if k>20 when TDD is used in all the configured serving cell(s) of the UE, or if k>21 when FDD is used in at least one of the configured serving cells with TDD primary cell, spatial bundling is applied to all subframes in all cells; or when PUCCH format 4 or PUCCH format 5 is configured and when the UE is configured with spatial bundling on PUSCH by higher layers, the multiplexing of HARQ-ACK bits is performed according to the following pseudo-code:

```
Set c = 0 - cell index: lower indices correspond to lower RRC indices of corresponding cell
Set j = 0 - HARQ-ACK bit index
while c < N_cells^DL
    set l = 0;
    while l < B_c^DL
        if transmission mode configured in cell c ∈ {1,2,5,6,7} - 1 bit HARQ-ACK feedback for this cell
            õ_j^ACK = o_{c,l}^ACK  HARQ-ACK bit of this cell as defined in Section 7.3 of [3]
            j = j + 1
        else
            õ_j^ACK = o_{c,l}^ACK  binary AND operation of the HARQ-ACK bits corresponding
            to the first and second codewords of this cell as defined in Section 7.3 of [3]
            j = j + 1
        end if
        l = l+1
    end while
    c = c + 1
end while
```

For $o^{ACK} \leq 11$ or $o^{ACK} > 22$, the bit sequence $o_0^{ACK}$, $o_1^{ACK}$, ..., $o_{O^{ACK}-1}^{ACK}$ is obtained by setting $o_i^{ACK} = \tilde{o}_i^{ACK}$. For $11 < o^{ACK} \leq 22$, $o_0^{ACK}$, $o_1^{ACK}$, ..., $o_{O^{ACK}-1}^{ACK}$ is obtained by setting $o_{i/2}^{ACK} = \tilde{o}_i^{ACK}$ if i is even and $o_{\lceil o^{ACK}/2 \rceil + (i-1)/2}^{ACK} = \tilde{o}_i^{ACK}$ if i is odd.

For the cases with TDD primary cell when HARQ-ACK is for the aggregation of two DL cells and the UE is configured with PUCCH format 1b with channel selection, the bit sequence $o_0^{ACK}$, $o_1^{ACK}$, ..., $o_{O^{ACK}-1}^{ACK}$ is obtained as described in section 7.3 of [3].

For TDD HARQ-ACK bundling, a bit sequence $\tilde{q}_0^{ACK}$, $\tilde{q}_1^{ACK}$, $\tilde{q}_2^{ACK}$, ..., $\tilde{q}_{Q_{ACK}-1}^{ACK}$ is obtained by concatenation of multiple encoded HARQ-ACK blocks where $Q_{ACK}$ is the total number of coded bits for all the encoded HARQ-ACK blocks. The last concatenation of the encoded HARQ-ACK block may be partial so that the total bit sequence length is equal to $Q_{ACK}$. A scrambling sequence $[w_0^{ACK} w_1^{ACK} w_2^{ACK} w_3^{ACK}]$ is then selected from Table 5.2.2.6-A with index i=($N_{bundled}$−1)mod 4, where $N_{bundled}$ is determined as described in section 7.3 of [3]. The bit sequence $q_0^{ACK}$, $q_1^{ACK}$, $q_2^{ACK}$, ..., $q_{Q_{ACK}-1}^{ACK}$ is then generated by setting m=1 if HARQ-ACK consists of 1-bit and m=3 if HARQ-ACK consists of 2-bits and then scrambling $\tilde{q}_0^{ACK}$, $\tilde{q}_1^{ACK}$, $\tilde{q}_2^{ACK}$, ..., $\tilde{q}_{Q_{ACK}-1}^{ACK}$ as follows

```
Set i ,k to 0
while i < Q_ACK
    if q̃_i^ACK = y        // place-holder repetition bit
```

-continued

```
        q_i^ACK = (q̃_{i-1}^ACK + w_{⌊k/m⌋}^ACK)mod 2
        k = (k + 1)mod4m
    else
        if q̃_i^ACK = x        // a place-holder bit
            q_i^ACK = q̃_i^ACK
        else                  // coded bit
            q_i^ACK = (q̃_i^ACK + w_{⌊k/m⌋}^ACK)mod2
            k = (k + 1)mod4m
```

-continued

```
    end if
    i = i +1
end while
```

[Table 5.2.2.6-A of 3GPP TS 36.212 v13.0.0, Entitled "Scrambling Sequence Selection for TDD HARQ-ACK Bundling", is Reproduced as FIG. 9]

When HARQ-ACK information is to be multiplexed with UL-SCH at a given PUSCH, the HARQ-ACK information is multiplexed in all layers of all transport blocks of that PUSCH, For a given transport block, the vector sequence output of the channel coding for HARQ-ACK information is denoted by $q_0^{ACK}, q_1^{ACK}, \ldots, q_{Q'_{ACK}-1}^{ACK}$, where $q_i^{ACK}$, $i=0, \ldots, Q'_{ACK}-1$ are column vectors of length $(Q_m \cdot N_L)$ and where $Q'_{ACK} = Q_{ACK}/Q_m$ is obtained as follows:

```
Set i, k to 0
while i < Q_ACK
    q̂_k^ACK = [q_i^ACK ... q_{i+Q_m-1}^ACK] -- temporary row vector
                    N_L
    q_k^ACK = [q̂_k^ACK ... q̂_k^ACK]^T -- replicating the row vector
    q̂_k^ACK N_L times and transposing into a
    column vector
    i = i + Q_m
    k = k + 1
end while
``` where $N_L$ is the number of layers onto which the UL-SCH transport block is mapped.

For rank indication (RI) (RI only, joint report of RI and i1, joint report of CRI and RI, joint report of CRI,RI and i1, joint report of CRI,RI, and PTI, and joint report of RI and PTI) or CRI The corresponding bit widths for CRI feedback for PDSCH transmissions are given by Tables 5.2.2.6.1-3A, 5.2.2.6.2-3A, 5.2.2.6.3-3A, 5.2.3.3.1-3D, The corresponding bit widths for RI feedback for PDSCH transmissions are given by Tables 5.2.2.6.1-2, 5.2.2.6.2-3, 5.2.2.6.2-3B, 5.2.2.6.3-3, 5.2.2.6.3-3B, 5.2.3.3.1-3, 5.2.3.3.1-3A, 5.2.3.3.1-3B, 5.2.3.3.1-3C, 5.2.3.3.1-3D, 5.2.3.3.2-4, and 5.2.3.3.2-4A, 5.2.3.3.2-4B, 5.2.3.3.2-4C, 5.2.3.3.2-4D which are determined assuming the maximum number of layers as follows:

If the maxLayersMIMO-r10 is configured for the DL cell, the maximum number of layers is determined according to maxLayersMIMO-r10 for the DL cell Else,
  If the UE is configured with transmission mode 9, and the supportedMIMO-CapabilityDL-r10 field is included in the UE-EUTRA-Capability, the maximum number of layers is determined according to the minimum of the configured number of CSI-RS ports and the maximum of the reported UE downlink MIMO capabilities for the same band in the corresponding band combination.

If the UE is configured with transmission mode 9 and Class B CSI reporting with K>1 and RI and CRI are transmitted in the same reporting instance, and the supportedMIMO-CapabilityDL-r10 field is included in the UE-EUTRA-Capability, the maximum number of layers is determined according to the minimum of the maximum of number of antenna port of the configured CSI-RS resources and the maximum of the reported UE downlink MIMO capabilities for the same band in the corresponding band combination.

If the UE is configured with transmission mode 9, and the supportedMIMO-CapabilityDL-r10 field is not included in the UE-EUTRA-Capability, the maximum number of layers is determined according to the minimum of the configured number of CSI-RS ports and ue-Category (without suffix).

If the UE is configured with transmission mode 9 and Class B CSI reporting with K>1 and RI and CRI are transmitted in the same reporting instance, and the supportedMIMO-CapabilityDL-r10 field is not included in the UE-EUTRA-Capability, the maximum number of layers is determined according to the minimum of the maximum of number of antenna port of the configured CSI-RS resources and ue-Category (without suffix).

If the UE is configured with transmission mode 10, and the supportedMIMO-CapabilityDL-r10 field is included in the UE-EUTRA-Capability, the maximum number of layers for each CSI process is determined according to the minimum of the configured number of CSI-RS ports for that CSI process and the maximum of the reported UE downlink MIMO capabilities for the same band in the corresponding band combination.

If the UE is configured with transmission mode 10 and Class B CSI reporting with K>1 and RI and CRI are transmitted in the same reporting instance, and the supportedMIMO-CapabilityDL-r10 field is included in the UE-EUTRA-Capability, the maximum number of layers for each CSI process is determined according to the minimum of the maximum of number of antenna port of the configured CSI-RS resources in that CSI process and the maximum of the reported UE downlink MIMO capabilities for the same band in the corresponding band combination.

If the UE is configured with transmission mode 10, and the supportedMIMO-CapabilityDL-r10 field is not included in the UE-EUTRA-Capability, the maximum number of layers for each CSI process is determined according to the minimum of the configured number of CSI-RS ports for that CSI process and ue-Category (without suffix).

If the UE is configured with transmission mode 10 and Class B CSI reporting with K>1 and RI and CRI are transmitted in the same reporting instance, and the supportedMlMO-CapabilityDL-r10 field is not included in the UE-EUTRA-Capability, the maximum number of layers for each CSI process is determined according to the minimum of the maximum of number of antenna port of the configured CSI-RS resources in that CSI process and ue-Category (without suffix).

Otherwise the maximum number of layers is determined according to the minimum of the number of PBCH antenna ports and ue-Category (without suffix).

If RI feedback consists of 1-bit of information, i.e., $[o_0^{RI}]$, it is first encoded according to Table 5.2.2.6-3. The $[o_0^{RI}]$ to RI mapping is given by Table 5.2.2.6-5.

If RI feedback consists of 2-bits of information, i.e., $[o_0^{RI} \; o_1^{RI}]$ with $o_0^{RI}$ corresponding to MSB of 2-bit input and $o_1^{RI}$ corresponding to LSB, it is first encoded according to Table 5.2.2.6-4 where $o_2^{RI} = (o_0^{RI} + o_1^{RI}) \bmod 2$. The $[o_0^{RI} \; o_1^{RI}]$ to RI mapping is given by Table 5.2.2.6-6.

[Table 5.2.2.6-3 of 3GPP TS 36.212 v13.0.0, Entitled "Encoding of 1-Bit RI", is Reproduced as FIG. 10]

[Table 5.2.2.6-4 of 3GPP TS 36.212 v13.0.0, Entitled "Encoding of 2-Bit RI", is Reproduced as FIG. 11]

[Table 5.2.2.6-5 of 3GPP TS 36.212 v13.0.0, Entitled "$o_0^{RI}$ to RI Mapping", is Reproduced as FIG. 12]

[Table 5.2.2.6-6 of 3GPP TS 36.212 v13.0.0, Entitled "$o_0^{RI}$, $o_1^{RI}$ to RI Mapping", is Reproduced as FIG. 13]

[Table 5.2.2.6-7 of 3GPP TS 36.212 v13.0.0, Entitled "$o_0^{RI}$, $o_1^{RI}$, $o_2^{RI}$ to RI Mapping", is Reproduced as FIG. 14]

If RI feedback for a given DL cell consists of 3-bits of information, i.e., $[o_0^{RI}\ o_1^{RI}\ o_2^{RI}]$ with $o_0^{RI}$ corresponding to MSB of 3-bit input and $o_2^{RI}$ corresponding to LSB. The $[o_0^{RI}\ o_1^{RI}\ o_2^{RI}]$ to RI mapping is given by Table 5.2.2.6-7.

If RI feedback consists of $3 \leq O^{RI} \leq 11$ bits of information, i.e., $[o_0^{RI}\ o_1^{RI}, \ldots, o_{O^{RI}-1}^{RI}]$, then a coded bit sequence $[\tilde{q}_0^{RI}\ \tilde{q}_1^{RI}, \ldots, \tilde{q}_{31}^{RI}]$ is obtained by using the bit sequence $[o_0^{RI}\ o_1^{RI}, \ldots, o_{O^{RI}-1}^{RI}]$ as the input to the channel coding block described in section 5.2.2.6.4.

If RI feedback consists of $11 \leq O^{RI} \leq 22$ bits of information as a result of the aggregation of RI bits corresponding to multiple DL cells or multiple CSI processes, i.e., $[o_0^{RI}\ o_1^{RI}, \ldots, o_{O^{RI}-1}^{RI}]$, then the coded bit sequence, $q_0^{RI}, q_1^{RI}, q_2^{RI}, \ldots, q_{Q_{RI}-1}^{RI}$ is obtained by using the bit sequence $[o_0^{RI}\ o_1^{RI}, \ldots, o_{O^{RI}-1}^{RI}]$ as the input to the channel coding block described in section 5.2.2.6.5.

If RI feedback consists of $O^{RI} > 22$ bits of information as a result of the aggregation of RI bits corresponding to multiple DL cells or multiple CSI processes, i.e., $[o_0^{RI}\ o_1^{RI}, \ldots, o_{O^{RI}-1}^{RI}]$, then the coded bit sequence is denoted by $q_0^{RI}, q_1^{RI}, q_2^{RI}, \ldots, q_{Q_{RI}-1}^{RI}$. The CRC attachment, channel coding and rate matching of the HARQ-ACK bits are performed according to sections 5.1.1 setting L to 8 bits, 5.1.3.1 and 5.1.4.2, respectively. The input bit sequence to the CRC attachment operation is $[o_0^{RI}\ o_1^{RI}, \ldots, o_{O^{RI}-1}^{RI}]$. The output bit sequence of the CRC attachment operation is the input bit sequence to the channel coding operation. The output bit sequence of the channel coding operation is the input bit sequence to the rate matching operation.

The "x" and "y" in Table 5.2.2.6-3 and 5.2.2.6-4 are placeholders for [2] to scramble the RI bits in a way that maximizes the Euclidean distance of the modulation symbols carrying rank information.

For the case where RI feedback for more than one DL cell is to be reported, the RI report for each DL cell is concatenated prior to coding in increasing order of cell index.

For the case where RI feedback for more than one CSI process is to be reported, the RI reports are concatenated prior to coding first in increasing order of CSI process index for each DL cell and then in increasing order of cell index.

For the case where RI feedback consists of one or two bits of information the bit sequence $q_0^{RI}, q_1^{RI}, q_2^{RI}, \ldots, q_{Q_{RI}-1}^{RI}$ is obtained by concatenation of multiple encoded RI blocks where $Q_{RI}$ is the total number of coded bits for all the encoded RI blocks. The last concatenation of the encoded RI block may be partial so that the total bit sequence length is equal to $Q_{RI}$.

For the case where RI feedback consists of $3 < O^{RI} \leq 11$ bits of information, the bit sequence $q_0^{RI}, q_1^{RI}, q_2^{RI}, \ldots, q_{Q_{RI}-1}^{RI}$ is obtained by the circular repetition of the bit sequence $\tilde{q}_0^{RI}, \tilde{q}_1^{RI}, \ldots, \tilde{q}_-^{RI}$ so that the total bit sequence length is equal to $Q_{RI}$.

When rank information is to be multiplexed with UL-SCH at a given PUSCH, the rank information is multiplexed in all layers of all transport blocks of that PUSCH. For a given transport block, the vector sequence output of the channel coding for rank information is denoted by $q_0^{RI}, q_1^{RI}, \ldots, q_{Q'_{RI}-1}^{RI}$, where $q_i^{RI}$, i=0, ..., $Q'_{RI}-1$ are column vectors of length $(Q_m \cdot N_L)$ and where $Q'_{RI} = Q_{RI}/Q_m$. The vector sequence is obtained as follows:

Set i, j, k to 0
while i<$Q_{RI}$
$\hat{q}_k^{RI} = [q_i^{RI} \ldots q_{i+Q_m-1}^{RI}]$—temporary row vector $$q_k^{RI} = [\hat{q}_k^{RI} \cdots \hat{q}_k^{RI}]^T \bigg\} N_L$$

—replicating the row vector $\hat{q}_k^{RI}$ $N_L$ times and transposing into a column vector
i=i+$Q_m$
k=k+1
end while where $N_L$ is the number of layers onto which the UL-SCH transport block is mapped.

The same procedures for encoding of RI and RI multiplexing with UL-SCH at a given PUSCH are applied for CRI, using CRI instead of RI in the equations.

For channel quality control information (CQI and/or PMI) denoted as CQI/PMI);

When the UE transmits channel quality control information bits, it shall determine the number of modulation coded symbols per layer Q' for channel quality information as $$Q' = \min\left(\left\lceil \frac{(O+L) \cdot M_{sc}^{PUSCH\text{-}initial(x)} \cdot N_{symb}^{PUSCH\text{-}initial(x)} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right)$$

where
O is the number of CQI/PMI bits, and
L is the number of CRC bits given by $$L = \begin{cases} 0 & O \leq 11 \\ 8 & \text{otherwise} \end{cases},$$

and
$Q_{CQI} = Q_m^{(x)} \cdot Q'$ and $\beta_{offset}^{PUSCH} = \beta_{offset}^{CQI}$, where $\beta_{offset}^{CQI}$ shall be determined according to [3] depending on the number of transmission codewords for the corresponding PUSCH, and on the uplink power control subframe set for the corresponding PUSCH when two uplink power control subframe sets are configured by higher layers for the cell.

If RI or CRI is not transmitted then $Q_{RI}^{(x)} = 0$.

The variable "x" in $K_r^{(x)}$ represents the transport block index corresponding to the highest $I_{MCS}$ value indicated by the initial UL grant. In case the two transport blocks have the same $I_{MCS}$ value in the corresponding initial UL grant, "x=1", which corresponds to the first transport block. $M_{sc}^{PUSCH\text{-}initial(x)}$, $C^{(x)}$, and $K_r^{(x)}$ are obtained from the initial PDCCH or EPDCCH for the same transport block. If there is no initial PDCCH or EPDCCH with DCI format 0 for the same transport block, $M_{sc}^{PUSCH\text{-}initial(x)}$, $C^{(x)}$, and $K_r^{(x)}$ shall be determined from:

the most recent semi-persistent scheduling assignment PDCCH or EPDCCH, when the initial PUSCH for the same transport block is semi-persistently scheduled, or, the random access response grant for the same transport block, when the PUSCH is initiated by the random access response grant.

$N_{symb}^{PUSCH\text{-}initial(x)}$ is the number of SC-FDMA symbols per subframe for initial PUSCH transmission for the same transport block.

For UL-SCH data information $G=N_L^{(x)} \cdot (N_{symb}^{PUSCH} \cdot M_{sc}^{PUSCH} \cdot Q_m^{(x)} - Q_{CQI} - Q_{RI}^{(x)})$, where $N_L^{(x)}$ is the number of layers the corresponding UL-SCH transport block is mapped onto, and $M_{sc}^{PUSCH}$ is the scheduled bandwidth for PUSCH transmission in the current sub-frame for the transport block, and $N_{symb}^{PUSCH}$ is the number of SC-FDMA symbols in the current PUSCH transmission sub-frame given by $N_{symb}^{PUSCH} = (2 \cdot (N_{symb}^{UL} - 1) - N_{SRS})$, where $N_{SRS}$ is equal to 1 if UE configured with one UL cell is configured to send PUSCH and SRS in the same subframe for initial transmission, or if UE transmits PUSCH and SRS in the same subframe for the current subframe in the same serving cell, or if the PUSCH resource allocation for the current subframe even partially overlaps with the cell-specific SRS subframe and bandwidth configuration defined in section 5.5.3 of [2], or if the current subframe in the same serving cell is a UE-specific type-1 SRS subframe as defined in Section 8.2 of [3], or if the current subframe in the same serving cell is a UE-specific type-0 SRS subframe as defined in section 8.2 of [3] and the UE is configured with multiple TAGs.

Otherwise $N_{SRS}$ is equal to 0.

In case of CQI/PMI report for more than one DL cell, $o_0, o_1, o_2, \ldots, o_{O-1}$ is the result of concatenating the CQI/PMI report for each DL cell in increasing order of cell index. For the case where CQI/PMI feedback for more than one CSI process is to be reported, $o_0, o_1, o_2, \ldots, o_{O-1}$ is the result of concatenating the CQI/PMI reports in increasing order of CSI process index for each DL cell and then in increasing order of cell index.

If the payload size is less than or equal to 11 bits, the channel coding of the channel quality information is performed according to section 5.2.2.6.4 with input sequence $o_0, o_1, o_2, \ldots, o_{O-1}$.

For payload sizes greater than 11 bits, the CRC attachment, channel coding and rate matching of the channel quality information is performed according to sections 5.1.1, 5.1.3.1 and 5.1.4.2, respectively. The input bit sequence to the CRC attachment operation is $o_0, o_1, o_2, \ldots, o_{O-1}$. The output bit sequence of the CRC attachment operation is the input bit sequence to the channel coding operation. The output bit sequence of the channel coding operation is the input bit sequence to the rate matching operation.

The output sequence for the channel coding of channel quality information is denoted by $q_0, q_1, q_2, q_3, \ldots, q_{N_L \cdot Q_{CQI}-1}$, where $N_L$ is the number of layers the corresponding UL-SCH transport block is mapped onto.

3GPP TS 36.212 v13.0.0 also states:

5.2.2.7 Data and Control Multiplexing

The control and data multiplexing is performed such that HARQ-ACK information is present on both slots and is mapped to resources around the demodulation reference signals. In addition, the multiplexing ensures that control and data information are mapped to different modulation symbols.

The inputs to the data and control multiplexing are the coded bits of the control information denoted by $q_0, q_1, q_2, q_3, \ldots, q_{N_L \cdot Q_{CQI}-1}$ and the coded bits of the UL-SCH denoted by $f_0, f_1, f_2, f_3, \ldots, f_{G-1}$. The output of the data and control multiplexing operation is denoted by $g_0, g_1, g_2, g_3, \ldots, g_{H'-1}$, where $H=(G+N_L \cdot Q_{CQI})$ and $H'=H/(N_L \cdot Q_m)$, and where $g_i$, $i=0, \ldots, H'-1$ are column vectors of length $(Q_m \cdot N_L)$. H is the total number of coded bits allocated for UL-SCH data and CQI/PMI information across the $N_L$ transmission layers of the transport block.

In case where more than one UL-SCH transport block are transmitted in a subframe of an UL cell, the CQI/PMI information is multiplexed with data only on the UL-SCH transport block with highest $I_{MCS}$ value on the initial grant. In case the two transport blocks have the same $I_{MCS}$ value in the corresponding initial UL grant, the CQI/PMI information is multiplexed with data only on the first transport block. For that UL-SCH transport block or in the case of single transport block transmission, and assuming that $N_L$ is the number of layers onto which the UL-SCH transport block is mapped, the control information and the data shall be multiplexed as follows:

```
Set i, j, k to 0
while j < N_L.Q_CQI -- first place the control information
    g_k = [q_j ...q_{j+N_L·Q_m-1}]^T
    j = j + N_L · Q_m
    k = k + 1
end while
while i < G -- then place the data
    g_k =[f_i ... f_{i+Q_m·N_L-1}]^T
    i = i+Q_m · N_L
    k = k + 1
end while
```

5.2.2.8 Channel Interleaver

The channel interleaver described in this section in conjunction with the resource element mapping for PUSCH in [2] implements a time-first mapping of modulation symbols onto the transmit waveform while ensuring that the HARQ-ACK and RI information are present on both slots in the subframe. HARQ-ACK information is mapped to resources around the uplink demodulation reference signals while RI information is mapped to resources around those used by HARQ-ACK.

The input to the channel interleaver are denoted by $g_0, g_1, g_2, \ldots, g_{H'-1}, q_0^{RI}, q_1^{RI}, q_2^{RI}, \ldots, q_{Q'_{RI}-1}^{RI}$ and $q_0^{ACK}, q_1^{ACK}, q_2^{ACK}, \ldots, q_{Q'_{ACK}-1}^{ACK}$. In case where more than one UL-SCH transport block are transmitted in a subframe of an UL cell, the HARQ-ACK and RI information are multiplexed with data on both UL-SCH transport blocks.

The number of modulation symbols per layer in the subframe is given by $H'_{total}=H'+Q'_{RI}$. The output bit sequence from the channel interleaver is derived as follows:

(1) Assign $C_{max}=N_{symb}^{PUSCH}$ to be the number of columns of the matrix. The columns of the matrix are numbered 0, 1, 2, . . . , $C_{max}-1$ from left to right. $N_{symb}^{PUSCH}$ is determined according to section 5.2.2.6.

(2) The number of rows of the matrix is $R_{max}= (J'_{total} \cdot Q_m \cdot N_L)/C_{max}$ and we define $R'_{max}=R_{max}/(Q_m \cdot N_L)$.

The rows of the rectangular matrix are numbered 0, 1, 2, . . . , $R_{max}-1$ from top to bottom.

(3) If rank information is transmitted in this subframe, the vector sequence $\underline{q}_0^{RI}, \underline{q}_1^{RI}, \underline{q}_2^{RI}, \ldots, \underline{q}_{Q'_{RI}-1}^{RI}$ is written onto the columns indicated by Table 5.2.2.8-1, and by sets of $(Q_m \cdot N_L)$ rows starting from the last row and moving upwards according to the following pseudocode.

```
Set i, j to 0.
Set r to R_max' - 1
while i < Q_RI'
    c_RI = Column Set( j )
    y_{r×C_max+c_RI} = q_i^{RI}
    i = i + 1
    r = R_max' - 1 - ⌊i/4⌋
    j = (j + 3)mod4
end while
```

Where ColumnSet is given in Table 5.2.2.8-1 and indexed left to right from 0 to 3.

(4) Write the input vector sequence, for k=0, 1, . . . , H'-1, into the ($R_{max} \times C_{max}$) matrix by sets of $(Q_m \cdot N_L)$ rows starting with the vector $\underline{y}_0$ in column 0 and rows 0 to $(Q_m \cdot N_L-1)$ and skipping the matrix entries that are already occupied:

$$\begin{bmatrix} \underline{y}_0 & \underline{y}_1 & \underline{y}_2 & \cdots & \underline{y}_{C_{max}-1} \\ \underline{y}_{C_{max}} & \underline{y}_{C_{max}+1} & \underline{y}_{C_{max}+2} & \cdots & \underline{y}_{2C_{max}-1} \\ \vdots & \vdots & \vdots & \ddots & \vdots \\ \underline{y}_{(R'_{max}-1)\times C_{max}} & \underline{y}_{(R'_{max}-1)\times C_{max}+1} & \underline{y}_{(R'_{max}-1)\times C_{max}+2} & \cdots & \underline{y}_{(R'_{max}\times C_{max}-1)} \end{bmatrix}$$

The pseudocode is as follows:

```
Set i, k to 0.
while k < H',
    if y_i is not assigned to RI symbols
        y_i = g_k
        k = k + 1
    end if
    i = i+1
end while
```

(5) If HARQ-ACK information is transmitted in this subframe, the vector sequence $\underline{q}_0^{ACK}, \underline{q}_1^{ACK}, \underline{q}_2^{ACK}, \ldots, \underline{q}_{Q'_{ACK}-1}^{ACK}$ is written onto the columns indicated by Table 5.2.2.8-2, and by sets of $(Q_m \cdot N_L)$ rows starting from the last row and moving upwards according to the following pseudo-code. Note that this operation overwrites some of the channel interleaver entries obtained in step (4).

```
Set i, j to 0.
Set r to R_max' - 1
while i < Q_ACK'
    c_ACK = ColumnSet(j)
    y_{r×C_max+c_ACK} = q_i^{ACK}
    i = i + 1
    r = R_max' - 1 - ⌊i/4⌋
    j = (j + 3)mod4
end while
```

Where ColumnSet is given in Table 5.2.2.8-2 and indexed left to right from 0 to 3.

(6) The output of the block interleaver is the bit sequence read out column by column from the ($R_{max} \times C_{max}$) matrix. The bits after channel interleaving are denoted by $h_0, h_1, h_2, \ldots, h_{H+N_L \cdot Q_{RI}-1}$, where $N_L$ is the number of layers the corresponding UL-SCH transport block is mapped onto.

[Table 5.2.2.8-1 of 3GPP TS 36.212 v13.0.0, Entitled "Column Set for Insertion of Rank Information", is Reproduced as FIG. 15]

[Table 5.2.2.8-2 of 3GPP TS 36.212 v13.0.0, Entitled "Column Set for Insertion of HARQ-ACK Information", is Reproduced as FIG. 16]

The same channel interleaver procedures for RI are applied for CRI, using CRI instead of RI in the equations.

3GPP TS 36.212 v13.0.0 also states:

5.2.4 Uplink Control Information on PUSCH without UL-SCH Data

When control data are sent via PUSCH without UL-SCH data, the following coding steps can be identified:
Channel coding of control information
Control information mapping
Channel interleaver 5.2.4.1 Channel Coding of Control Information Control data arrives at the coding unit in the form of channel quality information (CQI and/or PMI), HARQ-ACK and rank indication. Different coding rates for the control information are achieved by allocating different number of coded symbols for its transmission. When the UE transmits HARQ-ACK bits or rank indicator bits, it shall determine the number of coded symbols Q' for HARQ-ACK or rank indicator as $$Q' = min\left(\left\lceil \frac{O \cdot M_{sc}^{PUSCH} \cdot N_{symb}^{PUSCH} \cdot \beta_{offset}^{PUSCH}}{O_{CQI-MIN}} \right\rceil, 4 \cdot M_{sc}^{PUSCH}\right)$$

where O is the number of HARQ-ACK bits as defined in section 5.2.2.6, or rank indicator bits, $O_{CQI-MIN}$ is the number of CQI bits including CRC bits assuming rank equals to 1 for all serving cells for which an aperiodic CSI report is triggered [3], $M_{sc}^{PUSCH}$ is the scheduled bandwidth for PUSCH transmission in the current subframe expressed as a number of subcarriers in [2], and $N_{symb}^{PUSCH}$ is the number of SC-FDMA symbols in the current PUSCH transmission sub frame given by $N_{symb}^{PUSCH}=(2 \cdot (N_{symb}^{UL}-1)-N_{SRS})$, where $N_{SRS}$ is equal to 1 if UE is configured to send PUSCH and SRS in the same subframe for the current subframe, or if the PUSCH resource allocation for the current subframe even partially overlaps with the cell-specific SRS subframe and bandwidth configuration defined in section 5.5.3 of [2], or if the current subframe is a UE-specific type-1 SRS subframe as defined in Section 8.2 of [3], or if the current subframe is a UE-specific type-0 SRS subframe as defined in section 8.2 of [3] and the UE is configured with multiple TAGs. Otherwise $N_{SRS}$ is equal to 0.

For HARQ-ACK information $Q_{ACK}=Q_m \cdot Q'$ and $[\beta_{offset}^{PUSCH}=\beta_{offset}^{HARQ-ACK}/\beta_{offset}^{CQI}]$. For UEs configured with no more than five DL cells, $\beta_{offset}^{HARQ-ACK}$ shall be determined according to [3]. For UEs configured with more than five DL cells, $\beta_{offset}^{HARQ-ACK}$ shall be determined according to [3] depending on the number of HARQ-ACK feedback bits.

For rank indication or CRI, $Q_{RI}=Q_m \cdot Q'$, $Q_{CRI}=Q_m \cdot Q'$ and $[\beta_{offset}^{PUSCH}=\beta_{offset}^{RI}/\beta_{offset}^{CQI}]$, where $\beta_{offset}^{RI}$ shall be determined according to [3].

For CQI and/or PMI information $Q_{CQI}=N_{symb}^{PUSCH} \cdot M_{sc}^{PUSCH} \cdot Q_m - Q_{RI}$.

The channel coding and rate matching of the control data is performed according to section 5.2.2.6. The coded output sequence for channel quality information is denoted by $q_0, q_1, q_2, q_3, \ldots, q_{Q_{CQI}-1}$, the coded vector sequence output for HARQ-ACK is denoted by $q_0^{ACK}, q_1^{ACK}, q_2^{ACK}, \ldots, q_{Q'_{ACK}-1}^{ACK}$ and the coded vector sequence output for rank indication or CRI, is denoted by $q_0^{RI}, q_1^{RI}, q_2^{RI}, \ldots, q_{Q'_m-1}^{RI}$.

5.2.4.2 Control Information Mapping

The input are the coded bits of the channel quality information denoted by $q_0, q_1, q_2, q_3, \ldots, q_{Q_{CQI}-1}$. The output is denoted by $\underline{g}_0, \underline{g}_1, \underline{g}_2, \underline{g}_3, \ldots, \underline{g}_{H'-1}$, where $H=Q_{CQI}$ and $H'=H/Q_m$, and where $\underline{g}_i$, $i=0, \ldots, H'-1$ are column vectors of length $Q_m$. H is the total number of coded bits allocated for CQI/PMI information.

The control information shall be mapped as follows:

```
Set j, k to 0
while j < Q_CQI
    g_k = [q_j ... q_{j+Q_m-1}]^T
    j = j + Q_m
    k = k + 1
end while
```

5.2.4.3 Channel Interleaver

The vector sequences $\underline{g}_0, \underline{g}_1, \underline{g}_2, \ldots, \underline{g}_{H'-1}, q_0^{RI}, q_1^{RI}, q_2^{RI}, \ldots, q_{Q'_{RI}-1}^{RI}$ and $q_0^{ACK}, q_1^{ACK}, q_2^{ACK}, \ldots, q_{Q'_{ACK}-1}^{ACK}$ are channel interleaved according section 5.2.2.8. The bits after channel interleaving are denoted by $h_0, h_1, h_2, \ldots, h_{H+Q_m-1}$.

Semi-persistent scheduling enables a UE to consider a configured uplink grant occurs periodically after it is initiated. It may be initiated by receiving a network signaling to initiate SPS (Semi-Persistent Scheduling). No network signaling is needed to allocate the following configured uplink grant after SPS is initiated. Based on 3GPP RP-150310, fast uplink access may be achieved by a specific type of SPS. The specific type of SPS is assumed to be with small size and short interval, for example, less than 10 ms.

Further, the specific type of SPS is assumed to be pre-allocated. An eNB may allocate this kind of SPS resource to a UE without receiving any scheduling request or buffer status information. When the UE has data available for transmission (as discussed in 3GPP TS 36.321 v12.5.0), the UE can use resource configured by the SPS for uplink transmission. Compared with requesting uplink resource via scheduling request (as discussed in 3GPP TS 36.321 v12.5.0), the latency can then be reduced if the interval of the resource configured by the SPS is short enough.

Figure 17:
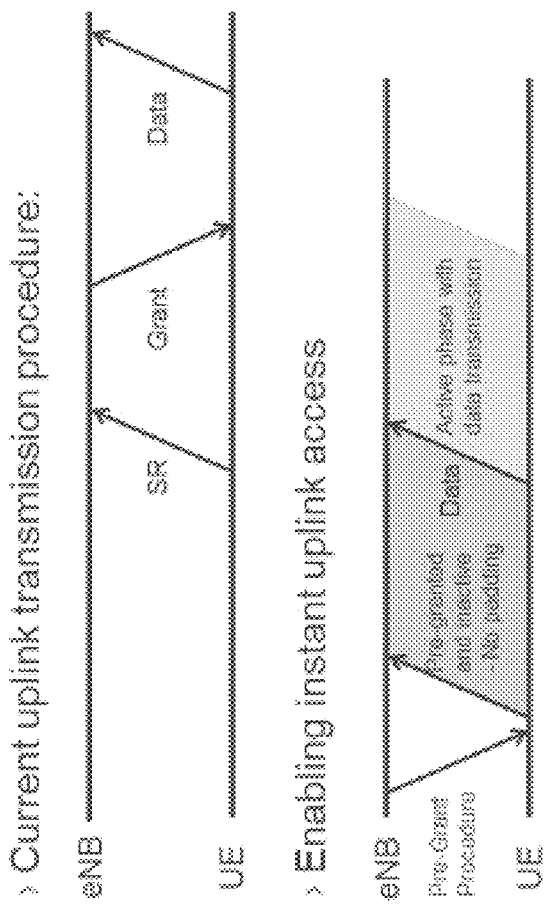
FIG. 17 is a diagram according to one exemplary embodiment.

Figure 2 of 3GPP RP-150310 is reproduced as FIG. 17. In general, FIG. 17 shows how pre-allocated uplink grant (such as allocated by SPS) improves latency reduction compared with scheduling request procedure specified in 3GPP TS 36.321 v12.5.0). The resource configured by the specific type of SPS may be separated from the resource configured by the legacy SPS (with longer interval) or jointly used.

In addition, it is also mentioned in 3GPP RP-150310 that the requirement of sending padding when there is UL resource but no data is in buffer can be removed. The intention of removing the requirement is to save battery power.

Based on 3GPP TS 36.213 v12.5.0, when a physical control information (such as channel quality indicator (CQI), Precoding Matrix Index (PMI), Rank Indicator (RI), and/or HARQ feedback) needs to be transmitted in a TTI, a UE should transmit the physical control information via either PUSCH or PUCCH. Traditionally, if an uplink grant for PUSCH is not available or the UE is allowed to perform transmission on PUCCH and PUSCH simultaneously, the physical control information is transmitted on PUCCH. If HARQ-ACK repetition is not configured, an uplink grant for PUSCH is available, and the UE is not allowed to perform transmission on PUCCH and PUSCH simultaneously (e.g., due to UE capability, UE power limitation, or eNB configuration), the physical control information is transmitted on PUSCH multiplexed with upper layer data (e.g., MAC PDU). If HARQ-ACK repetition is not configured and an uplink grant for PUSCH is available, the physical control information is transmitted on PUCCH and data is not transmitted, irrespective of whether the UE is allowed to perform transmission on PUCCH and PUSCH simultaneously or not. Note that the UE which is configured with HARQ-ACK repetition is reasonably not allowed to perform transmission on PUCCH and PUSCH simultaneously, given transmitting PUCCH and PUSCH simultaneously require proper channel quality and are usually configured for cell center UEs.

Three following scenarios are considered:

Scenario 1—

When a physical control information needs to be transmitted in a TTI, if a UE is unable to perform transmission on PUCCH and PUSCH simultaneously and the UE has data available for transmission, the UE traditionally multiplexes the physical control information with the data and transmits them on PUSCH jointly. However, if an assigned UL resource for PUSCH is small (e.g., a pre-allocated configured uplink resource which is assumed to be small), multiplexing the physical control information into PUSCH may jeopardize the data delivery because coding rate of the data may be worse than normal so that data transmission is likely to fail. In addition, since network (e.g., eNB) may not know whether the UE transmits the physical control information on PUCCH or PUSCH which may depend on whether the UE has data available for transmission or not, complexity of decoding the UE transmission is increased.

Scenario 2—

When a physical control information needs to be transmitted in a TTI, if a UE has data available for transmission and simultaneous transmission on PUCCH and PUSCH is enabled but the UE is not able to perform both transmissions on a control channel (e.g., PUCCH) and a data channel (e.g., PUSCH) with sufficient power, traditionally the UE prioritizes PUCCH transmission over PUSCH transmission. However, the data on PUSCH may not be transmitted in this TTI, or less power is used on PUSCH so that the PUSCH transmission is likely to fail.

Scenario 3—

If a UE does not have data available for transmission in a TTI, the UE would skip configured UL grant or dynamic uplink grant in that TTI. Thus, if the UE needs to transmit UCI (Uplink Control Information) in the TTI, UE would transmit the UCI on the PUCCH. However, if there is more than one UCI to be transmitted in one TTI, PUCCH may not be a good candidate to carry the UCI as it has limited capacity and the UE may require to drop some of the UCI mentioned in the background. Also, the available resource on PUCCH is limited and thus transmit the UCI on PUCCH may not be very robust.

In general, a configured uplink grant is available periodically after it is initiated. The configured uplink grant is initiated by a network signaling. No network signaling is needed to allocate the following configured uplink grant after it is initiated.

Unless specified otherwise, a UE may not use a configured uplink grant if no data is available for transmission. Unless specified otherwise, the UE may not transmit padding using the configured uplink grant. The period of the configured uplink grant may be less than a specified value. The specified value may be 10 ms or 10 TTIs. The period of the configured uplink grant may be 1 ms or 1 TTI. The period of the configured uplink grant may be 2 ms or 2 TTIs. The period of the configured uplink grant may be 5 ms or 5 TTIs.

TTI length may be 1 ms, 0.5 ms, or several OFDM (or SC-FDMA) symbol(s), e.g., 1, 2, 3, 4, 5, or 6 symbols. Throughout the application, the method may be applied for the case HARQ-ACK repetition is not configured, unless otherwise specified. Furthermore, throughout the application, a UE has data available for transmission may mean the UE has UL data in the buffer. The UE has data available for transmission may mean the UE has regular MAC control element for transmission. Throughout the application, the UE has data available for transmission may mean the UE has UL data in the buffer and regular MAC control element for transmission.

The configured uplink grant may be pre-allocated. A UE may be allocated the configured uplink grant when no data is available for transmission. The UE may be allocated the configured uplink grant before the UE transmits a scheduling request or a buffer status report.

To deal with Scenario 1, a solution is generally that when a configured uplink grant is available and a physical control information needs to be transmitted in a TTI, if a UE is unable to perform transmission on a control channel and a data channel simultaneously and the UE has data available for transmission, the UE transmits the physical control information on the control channel. Moreover, the UE does not use the configured uplink grant for transmission on the data channel. Examples are listed in FIG. 18 and FIG. 19.

To deal with Scenario 1, a second solution is generally that when a configured uplink grant is available and a physical control information needs to be transmitted in a TTI, the UE would transmit the physical control information on a control channel if HARQ-ACK repetition is not configured and if the UE is unable to perform transmission on the control channel and a data channel simultaneously and the UE has data available for transmission. And if HARQ-ACK repetition is configured and the UE has data available for transmission, the UE would transmit the physical control information on the control channel. Moreover, the UE does not use the configured uplink grant for transmission on the data channel.

To deal with Scenario 1, a third solution is to determine which channel to transmit a physical control information in a TTI according to an uplink grant on a data channel in the TTI. In one embodiment, determining which channel to transmit the physical control information is to determine to transmit the physical control information on the data channel or on a control channel. Furthermore, the determination may be different for different types of UCI, such as HARQ-ACK, CQI/PMI/RI, SR(Scheduling Request).

In one embodiment, determination is according to a type of the uplink grant. In one example, uplink grant type can be an uplink grant periodically available or an uplink grant for a specific TTI. More specifically, determining based on uplink grant type means to transmit a physical control information on a control channel if the uplink grant is periodically available, and to transmit the physical control information on a data channel if the uplink grant is for the specific TTI.

In one embodiment, determination is based on the purpose of the uplink grant. An example of purpose is whether the uplink grant is for latency reduction or not. The purpose of the uplink grant may be known according to an indication, a configuration, a periodicity of the uplink grant, or an identifier to address the uplink grant. For the example, if the uplink grant is addressed by one RNTI (Radio Network Temporary Identifier), the UE transmits a physical control information on a control channel. If the uplink grant is addressed by another RNTI, the UE transmits the physical control information on a data channel.

In one embodiment, determination is based on the available resource of the uplink grant. More specifically, the available resource of an uplink grant is a TTI length of the uplink grant. Alternatively, the available resource of the uplink grant is a number of PRB (pairs) of the uplink grant. Alternatively, the available resource of the uplink grant is a TTI length of the uplink grant and a number of PRB (pairs) of the uplink grant. In one example, if the available resource of the uplink grant is less than a specific value, the UE transmits the physical control information on a control channel and if the available resource of the uplink grant is more than a specific value, the UE transmits the physical control information on a data channel. More specifically, the specific value is fixed or configured for a UE. Alternatively, the specific value is derived according to payload size or amount of physical control information. Alternatively, the specific value is derived according to a type of the physical control information, e.g. HARQ-ACK/CQI/PMI/RI/SR (Scheduling Request). Alternatively, the specific value is derived according to a MCS (Modulation and Coding Scheme) of the uplink grant. Furthermore, the specific value is set to guarantee the code rate of the physical control information if it is carried on the data channel.

If a UE behavior can be consistent no matter the UE has data available or not (e.g., a physical control information is transmitted on a control channel as listed in FIG. 19), network decoding can be simplified because network does not need to assume different UE behaviors.

To deal with Scenario 2, a solution is generally that when a configured uplink grant is available and a physical control information needs to be transmitted in a TTI, a UE would transmit the physical control information on a data channel if the UE has data available for transmission and simultaneous transmission on a control channel and the data channel is enabled but the UE is not able to perform both transmissions on the control channel and the data channel with sufficient power. The power-insufficient case may be due to the sum of the computed power for the data channel and the computed power for the control channel exceed the maximum power of the UE.

More specifically, the UE multiplexes the physical control information with data on the data channel. The UE uses the configured uplink grant to transmit data on the data channel. Moreover, when a configured uplink grant is available and no data is available for transmission, the UE does not use the configured uplink grant for transmission on the data channel (e.g., transmit padding) if no physical control information needs to be transmitted in a TTI. Examples are listed in FIG. 18 and FIG. 20.

If a UE transmits a physical control information on a data channel and does not transmit it on a control channel, more power can be used on a data channel transmission and the data channel transmission may be more likely to succeed. On the other hand, if more than one physical control information needs to be transmitted in a TTI, some of the physical control information may be dropped due to the control channel configuration if the UE prioritizes the control channel transmission. Transmitting the physical control information on the data channel allows all physical control information to be transmitted.

To deal with Scenario 3, a solution is generally that a UE determines whether to skip a configured uplink grant or to skip a dynamic grant in a TTI according to whether a physical control information needs to be transmitted in the TTI or not. For example, when a configured uplink grant is available and if the UE does not have data available for transmission, if the physical control information needs to be transmitted in a TTI, the UE transmits the physical control information on a data channel. If no physical control information needs to be transmitted in a TTI, the UE skips the configured uplink grant.

In one embodiment, the UE skipping the configured uplink grant means that the UE does not perform transmission on a data channel. In another embodiment, the UE transmits a physical control information on the data channel with a transport block comprise padding (or padding MAC control element). More specifically, physical layer in the UE would indicate whether the physical control information needs to be transmitted in the TTI or not to MAC layer, so that MAC layer could decide whether to skip the grant. Alternatively, the UE transmits the physical control information on the data channel without padding (or without padding MAC control element). More specifically, MAC layer may indicate a configured uplink grant or a dynamic grant available for a TTI and indicate there is no data to be transmitted in the TTI so that physical layer in the UE could decide whether to use the grant to transmit the physical control information or to skip the UL grant and decide how to use the grant to transmit the physical control information.

There are several examples of how a UE transmits a physical control information on a data channel without padding (or without padding MAC control element). In one example, the UE treats all the physical control information as a regular transport block from MAC layer and perform regular encoding, such as CRC (Cyclic Redundancy Check) attachment, interleaving, channel coding, for the all the physical control information. In another example, the UE would perform a data channel transmission like perform a PUSCH transmission without UL-SCH (Uplink Shared Channel) data. More specifically, the UE treats a first type of physical control information (e.g., CQI and/or PMI) as a regular transport block from MAC layer, and performs regular encoding (such as CRC attachment, interleaving, channel coding) for the first type of physical control information. Furthermore, the UE multiplexes a second type of physical control information (e.g., HARQ-ACK and/or RI) on some resource of the data channel.

In one embodiment, for the above example(s), the UE would indicate a payload size of the physical control information on the data channel. More specifically, indication of the payload size is carried on some specific resource on the data channel. Alternatively, indication of the payload size is done by masking a CRC of the data channel.

In one embodiment, for the above example(s), the UE would assume a specific payload size to carry the physical control information on the data channel. In another embodiment, the UE would indicate whether the UE have data available for transmission or not on the data channel. More specifically, indication of whether the UE have data available for transmission or not is carried on some specific resource on the data channel. Alternatively, indication of whether the UE have data available for transmission or not is done by masking a CRC of the data channel. In addition, an eNB would assume both hypotheses that the UE have data available for transmission and the UE does not have data available for transmission to perform decoding.

In the above example, indicating information by masking a CRC of the data channel may mean that after CRC is generated, different sequence is utilized to mask the CRC. To indicate an one-bit information, two sequences may be required. Note that a sequence with all 1 is a special case and may mean no masking is done. In one embodiment, to mask a CRC may mean to perform exclusive or (XOR) operation or some other operation to the CRC with a sequence. From a receiver perspective, a reverse operation would be performed with different sequences and only one of them would pass the CRC check, so as to realize the indication according to which sequence could be used to pass the CRC check.

The physical control information may be CQI. The physical control information may be PMI, RI, and/or HARQ feedback. The UE may not be able to transmit the data channel and the control channel simultaneously (e.g., due to UE capability or power restriction). The data channel may be PUSCH. The control channel may be PUCCH.

Figure 23:
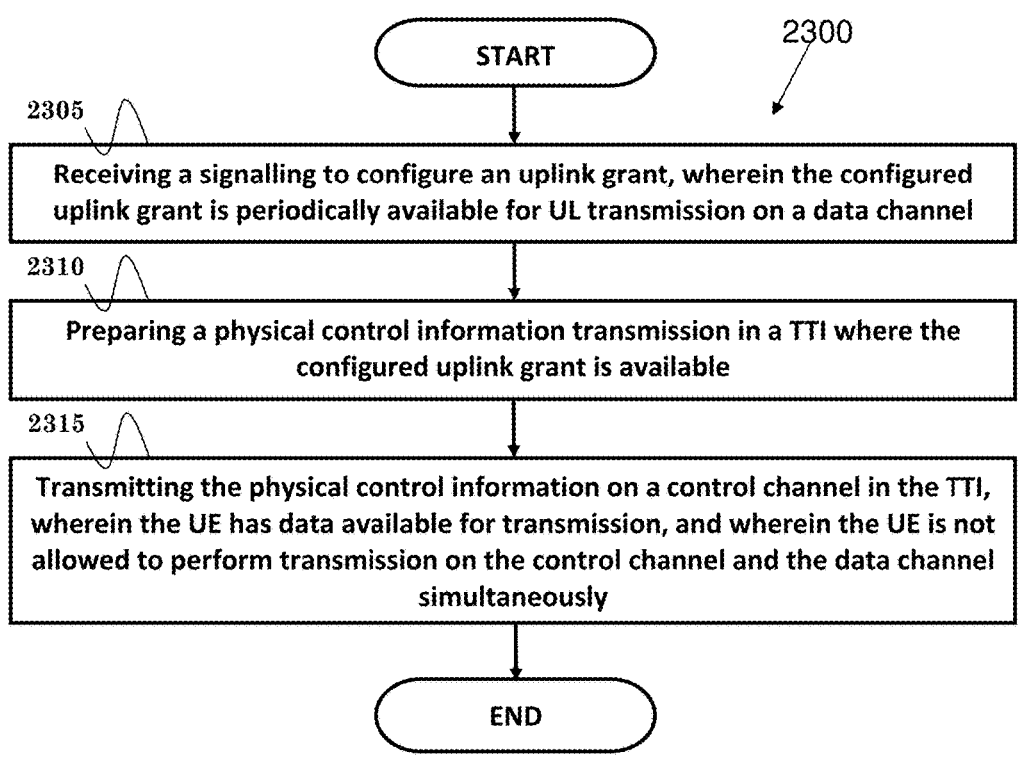
FIG. 23 is a flow chart according to one exemplary embodiment.

FIG. 23 is a flow chart 2300 according to one exemplary embodiment from the perspective of a UE. In step 2305, the UE receives a signalling to configure an uplink grant, wherein the configured uplink grant is periodically available for UL transmission on a data channel. In step 2310, the UE prepares a physical control information transmission in a TTI where the configured uplink grant is available. In step 2315, the UE transmits the physical control information on a control channel in the TTI, wherein the UE has data available for transmission, and wherein the UE is not allowed to perform transmission on the control channel and the data channel simultaneously.

Referring back to FIGS. 3 and 4, in one exemplary embodiment of a UE, the device 300 includes a program code 312 stored in the memory 310. The CPU 308 could execute program code 312 to enable the UE (i) to receive a signalling to configure an uplink grant, wherein the configured uplink grant is periodically available for UL transmission on a data channel, (ii) to prepare a physical control information transmission in a TTI where the configured uplink grant is available, and (iii) to transmit the physical control information on a control channel in the TTI, wherein the UE has data available for transmission, and wherein the UE is not allowed to perform transmission on the control channel and the data channel simultaneously. Furthermore, the CPU 308 can execute the program code 312 to perform all of the above-described actions and steps or others described herein.

Figure 24:
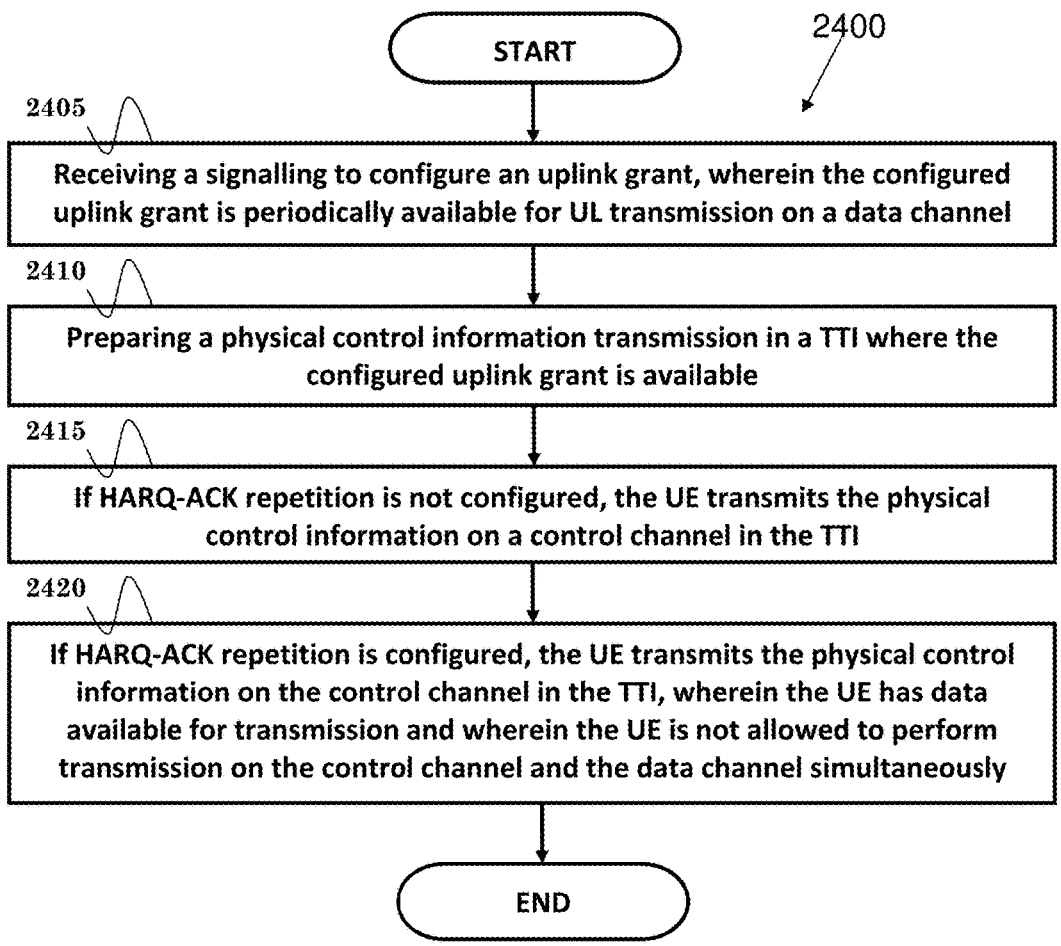
FIG. 24 is a flow chart according to one exemplary embodiment.

FIG. 24 is a flow chart 2400 according to one exemplary embodiment from the perspective of a UE. In step 2405, the UE receives a signalling to configure an uplink grant, wherein the configured uplink grant is periodically available for UL transmission on a data channel. In step 2410, the UE prepares a physical control information transmission in a TTI where the configured uplink grant is available. In step 2415, if HARQ-ACK repetition is not configured, the UE transmits the physical control information on a control channel in the TTI. In step 2420, if HARQ-ACK repetition is configured, the UE transmits the physical control information on the control channel in the TTI, wherein the UE has data available for transmission and wherein the UE is not allowed to perform transmission on the control channel and the data channel simultaneously.

Referring back to FIGS. 3 and 4, in one exemplary embodiment of a UE, the device 300 includes a program code 312 stored in the memory 310. The CPU 308 could execute program code 312 to enable the UE (i) to receive a signalling to configure an uplink grant, wherein the configured uplink grant is periodically available for UL transmission on a data channel, (ii) to prepare a physical control information transmission in a TTI where the configured uplink grant is available, (iii) to transmit the physical control information on a control channel in the TTI if HARQ-ACK repetition is not configured, and (iv) to transmit the physical control information on the control channel in the TTI if HARQ-ACK repetition is configured, wherein the UE has data available for transmission and wherein the UE is not allowed to perform transmission on the control channel and the data channel simultaneously. Furthermore, the CPU 308 can execute the program code 312 to perform all of the above-described actions and steps or others described herein.

Referring back to the embodiments illustrated in FIGS. 22 and 23, the UE does not use the configured uplink grant for a transmission on the data channel in one embodiment. The UE does not transmit the available data in one embodiment.

Figure 25:
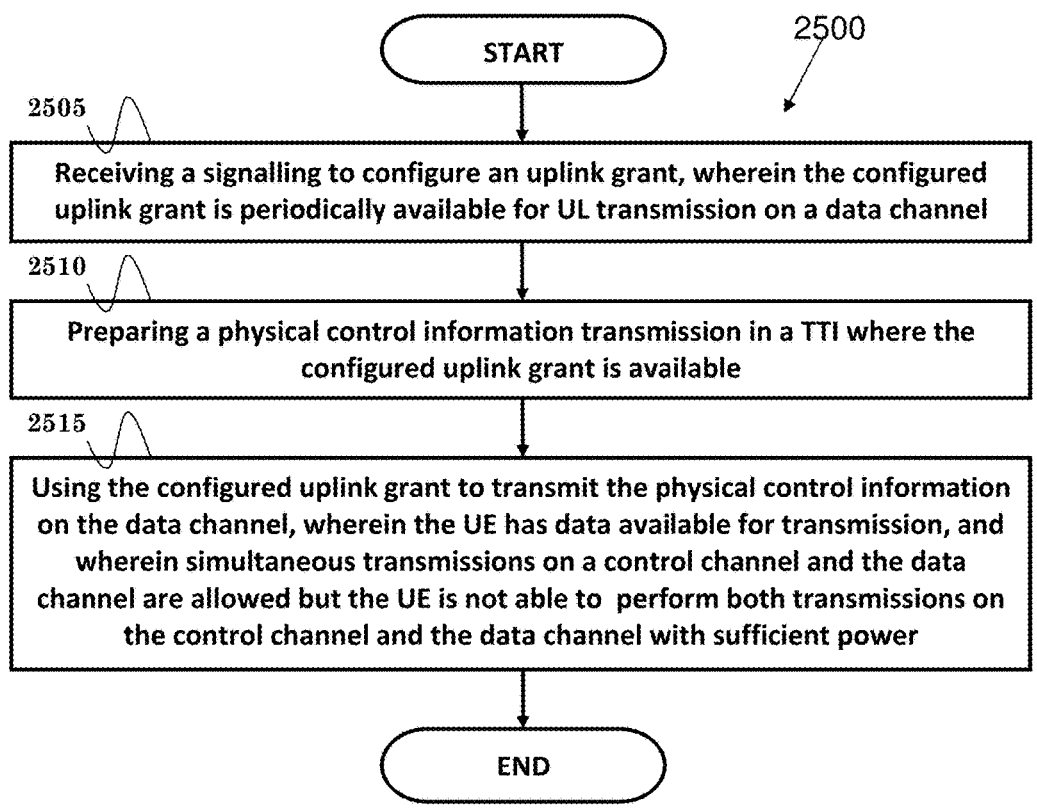
FIG. 25 is a flow chart according to one exemplary embodiment.

FIG. 25 is a flow chart 2500 according to one exemplary embodiment from the perspective of a UE. In step 2505, the UE receives a signalling to configure an uplink grant, wherein the configured uplink grant is periodically available for UL transmission on a data channel. In step 2510, the UE prepares a physical control information transmission in a TTI where the configured uplink grant is available. In step 2515, the UE uses the configured uplink grant to transmit the physical control information on the data channel, wherein the UE has data available for transmission, and wherein simultaneous transmission on a control channel and the data channel is allowed but the UE is not able to perform both transmissions on the control channel and the data channel with sufficient power.

In one embodiment, the UE multiplexes the physical control information with data on the data channel. The UE uses the configured uplink grant to transmit the physical control information on the data channel if no data is available for transmission. The UE does not use the configured uplink grant to transmit padding on the data channel if no physical control information needs to be transmitted in a TTI.

In one embodiment, the physical control information is CQI and/or HARQ feedback. No network signalling is needed to allocate the configured uplink grant after it is initiated. The configured uplink grant could be initiated by a network signalling or could be pre-allocated. The network signalling could be SPS initiation or re-initiation.

In one embodiment, the UE could receive the signalling before transmitting a scheduling request. The UE could receive the signalling before transmitting a BSR control element. The UE could receive the signalling when no data is available for transmission.

In one embodiment, the UE does not transmit a MAC PDU with padding only via the configured uplink grant. The padding could include: (i) padding bit(s), (ii) at least one subheader associated with padding bit(s), (iii) a MAC control element corresponding to a Padding BSR, (iv) a subheader associated with a MAC control element corresponding to a Padding BSR, (v) a MAC control element corresponding to a Padding Sidelink BSR, and/or (vi) a subheader associated with a MAC control element corresponding to a Padding Sidelink BSR.

In one embodiment, periodicity, where the configured uplink grant is available, is shorter than a specified value, such as 10 ms. Alternatively, the periodicity could be 1 ms, 2 ms or 5 ms.

In one embodiment, the signalling could be transmitted on PDCCH. The signalling could be addressed to Semi-Persistent Scheduling C-RNTI. The signalling could be a RRC message.

In one embodiment, the uplink grant could be on the data channel or on UL-SCH. The data available for transmission could mean that the data belonging to a logical channel, which could utilize the configured uplink grant, is available for transmission.

In one embodiment, the UE is not allowed to perform transmission on the control channel and the data channel based on network configuration. The control channel could be PUCCH. The data channel could be PUSCH. The UE not being able to perform both transmissions on the control channel and the data channel with sufficient power could mean that the sum of computed power for the data channel and the computed power for the control channel exceeds the maximum power of the UE.

Referring back to FIGS. 3 and 4, in one exemplary embodiment of a UE, the device 300 includes a program code 312 stored in the memory 310. The CPU 308 could execute program code 312 to enable the UE (i) to receive a signalling to configure an uplink grant, wherein the configured uplink grant is periodically available for UL transmission on a data channel, (ii) to prepare a physical control information transmission in a TTI where the configured uplink grant is available, and (iii) to use the configured uplink grant to transmit the physical control information on the data channel, wherein the UE has data available for transmission, and wherein simultaneous transmission on a control channel and the data channel is allowed but the UE is not able to perform both transmissions on the control channel and the data channel with sufficient power. Furthermore, the CPU 308 can execute the program code 312 to perform all of the above-described actions and steps or others described herein.

Figure 26:
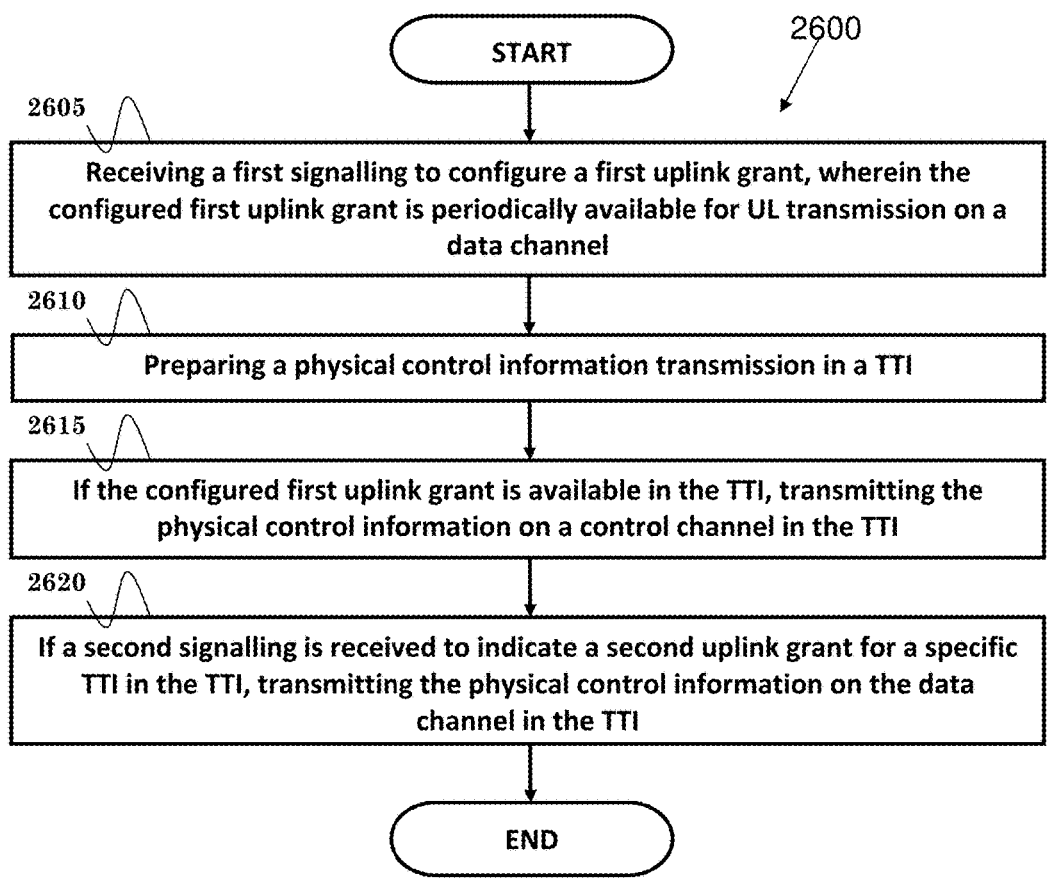
FIG. 26 is a flow chart according to one exemplary embodiment.

FIG. 26 is a flow chart 2600 according to one exemplary embodiment from the perspective of a UE. In step 2605, the UE receives a first signalling to configure a first uplink grant, wherein the configured first uplink grant is periodically available for UL transmission on a data channel. In step 2610, the UE prepares a physical control information transmission in a TTI. In step 2615, if the configured first uplink grant is available in the TTI, the UE transmits the physical control information on a control channel in the TTI. In step 2620, if a second signalling is received to indicate a second uplink grant for a specific TTI in the TTI, the UE transmits the physical control information on the data channel in the TTI.

In one embodiment, the UE does not use the configured first uplink grant for a transmission on the data channel if the physical control information is transmitted on the control channel. The UE is not allowed to perform transmission on the control channel and the data channel simultaneously.

Referring back to FIGS. 3 and 4, in one exemplary embodiment of a UE, the device 300 includes a program code 312 stored in the memory 310. The CPU 308 could execute program code 312 to enable the UE (i) to receive a first signalling to configure a first uplink grant, wherein the configured first uplink grant is periodically available for UL transmission on a data channel, (ii) to prepare a physical control information transmission in a given TTI, (iii) to transmit the physical control information on a control channel in the TTI if the configured first uplink grant is available in the TTI, and (iv) to transmit the physical control information on the data channel in the TTI if a second signalling is received to indicate a second uplink grant for a specific TTI in the TTI. Furthermore, the CPU 308 can execute the program code 312 to perform all of the above-described actions and steps or others described herein.

Figure 27:
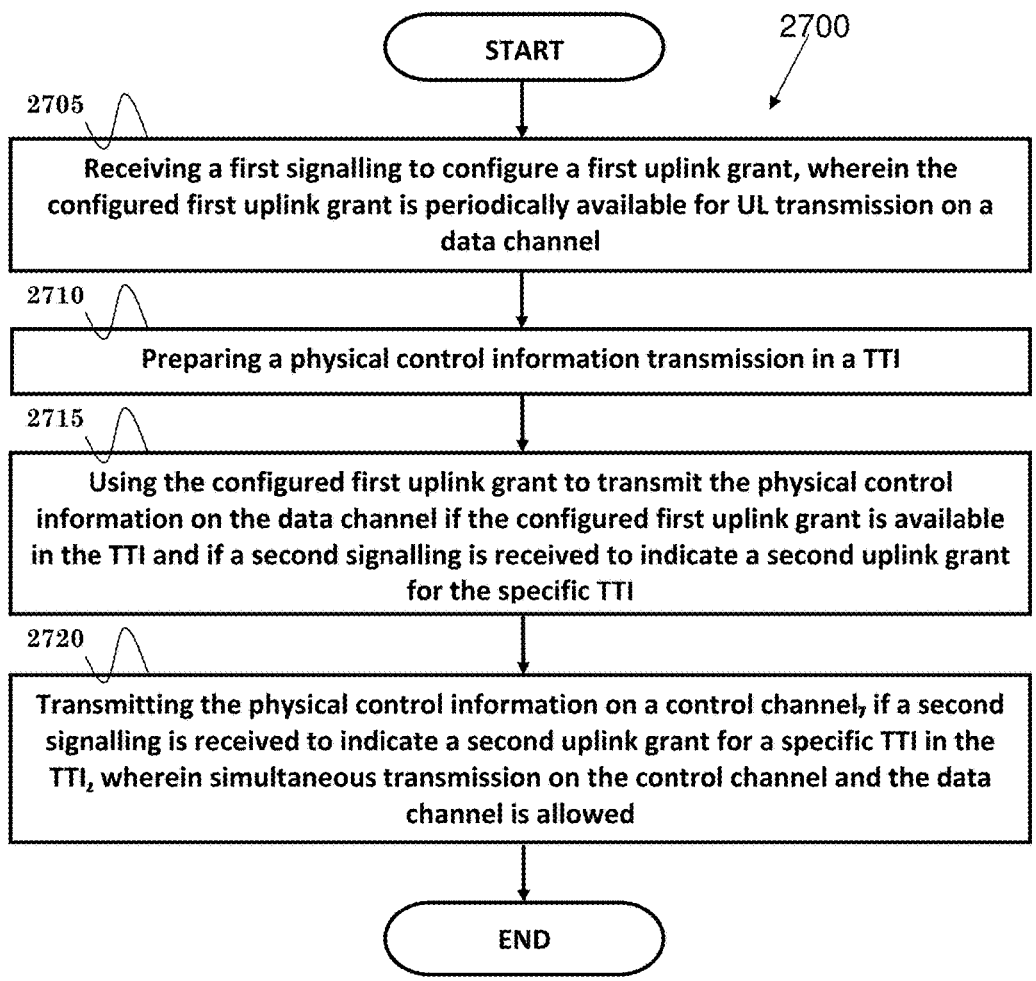
FIG. 27 is a flow chart according to one exemplary embodiment.

FIG. 27 is a flow chart 2700 according to one exemplary embodiment from the perspective of a UE. In step 2705, the UE receives a first signalling to configure a first uplink grant, wherein the configured first uplink grant is periodically available for UL transmission on a data channel. In step 2710, the UE prepares a physical control information transmission in a TTI. In step 2715, the UE uses the configured first uplink grant to transmit the physical control information on the data channel if the configured first uplink grant is available in the TTI. In step 2720, the UE transmits the physical control information on a control channel if a second signalling is received to indicate a second uplink grant for a specific TTI in the TTI, wherein simultaneous transmission on the control channel and the data channel is allowed.

In one embodiment, the UE multiplexes the physical control information with data on the data channel if the physical control information is transmitted on the data channel. The UE uses the configured first uplink grant to transmit the physical control information on the data channel if no data is available for transmission. The UE does not use the configured first uplink grant to transmit padding on the data channel if no physical control information needs to be transmitted in a TTI. The UE uses the second uplink grant to transmit padding on the data channel if no physical control information needs to be transmitted in the TTI. The UE uses the second uplink grant to transmit data if data is available for transmission.

In one embodiment, the physical control information could be CQI and/or HARQ feedback. No network signalling is needed to allocate the configured first uplink grant after it is initiated. The configured first uplink grant could be initiated by a network signalling, or could be pre-allocated. The network signalling could be SPS initiation or re-initiation.

In one embodiment, the UE could receive the signalling before transmitting a scheduling request. The UE could receive the signalling before transmitting a BSR control element. The UE could receive the signalling when no data is available for transmission.

In one embodiment, the UE does not transmit a MAC PDU with padding only via the configured first uplink grant. The padding could include: (i) padding bit(s), (ii) at least one subheader associated with padding bit(s), (iii) a MAC control element corresponding to a Padding BSR, (iv) a subheader associated with a MAC control element corresponding to a Padding BSR, (v) a MAC control element corresponding to a Padding Sidelink BSR, (vi) a subheader associated with a MAC control element corresponding to a Padding Sidelink BSR.

In one embodiment, periodicity, where the configured first uplink grant is available, is shorter than a specified value, such as 10 ms. Alternatively, the periodicity could be 1 ms, 2 ms or 5 ms.

In one embodiment, the first signalling could be transmitted on PDCCH. The first signalling could be addressed to Semi-Persistent Scheduling C-RNTI. The first signalling could be a RRC message.

In one embodiment, the second signalling could be transmitted on PDCCH. Furthermore, the second signalling could be addressed to C-RNTI.

In one embodiment, the first uplink grant and the second uplink grant could be on the data channel or on UL-SCH. Furthermore, the data available for transmission means that the data belonging to a logical channel that can utilize the configured first uplink grant is available for transmission. The UE is not allowed to perform transmission on the control channel and the data channel based on network configuration. The control channel could be PUCCH. The data channel could be PUSCH.

Referring back to FIGS. 3 and 4, in one exemplary embodiment of a UE, the device 300 includes a program code 312 stored in the memory 310. The CPU 308 could execute program code 312 to enable the UE (i) to receive a first signalling to configure a first uplink grant, wherein the configured first uplink grant is periodically available for UL transmission on a data channel, (ii) to prepare a physical control information transmission in a given TTI, (iii) to use the configured first uplink grant to transmit the physical control information on the data channel if the configured first uplink grant is available in the TTI, and (iv) to transmit the physical control information on a control channel if a second signalling is received to indicate an uplink grant for a specific TTI in the TTI, wherein simultaneous transmission on the control channel and the data channel is allowed. Furthermore, the CPU 308 can execute the program code 312 to perform all of the above-described actions and steps or others described herein.

Figure 28:
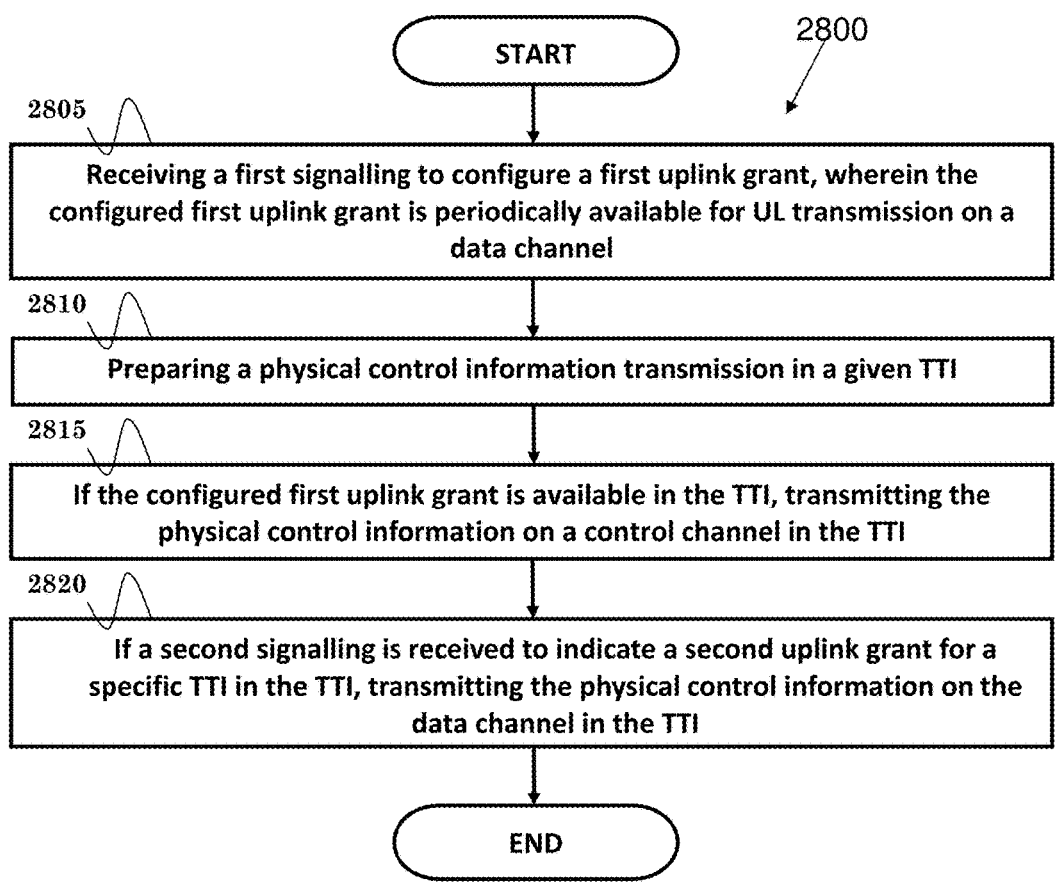
FIG. 28 is a flow chart according to one exemplary embodiment.

FIG. 28 is a flow chart 2800 according to one exemplary embodiment from the perspective of a UE. In step 2805, the UE receives a first signalling to configure a first uplink grant, wherein the configured first uplink grant is periodically available for UL transmission on a data channel. In step 2810, the UE prepares a physical control information transmission in a given TTI. In step 2815, if the configured first uplink grant is available in the TTI, the UE transmits the physical control information on a control channel in the TTI. In step 2820, if a second signalling is received to indicate a second uplink grant for a specific TTI in the TTI, the UE transmits the physical control information on the data channel in the TTI.

Referring back to FIGS. 3 and 4, in one exemplary embodiment of a UE, the device 300 includes a program code 312 stored in the memory 310. The CPU 308 could execute program code 312 to enable the UE (i) to receive a first signalling to configure a first uplink grant, wherein the configured first uplink grant is periodically available for UL transmission on a data channel, (ii) to prepare a physical control information transmission in a given TTI, (iii) to transmit the physical control information on a control channel in the TTI if the configured first uplink grant is available in the TTI, and (iv) to transmit the physical control information on the data channel in the TTI if a second signalling is received to indicate a second uplink grant for a specific TTI in the TTI. Furthermore, the CPU 308 can execute the program code 312 to perform all of the above-described actions and steps or others described herein.

Figure 29:
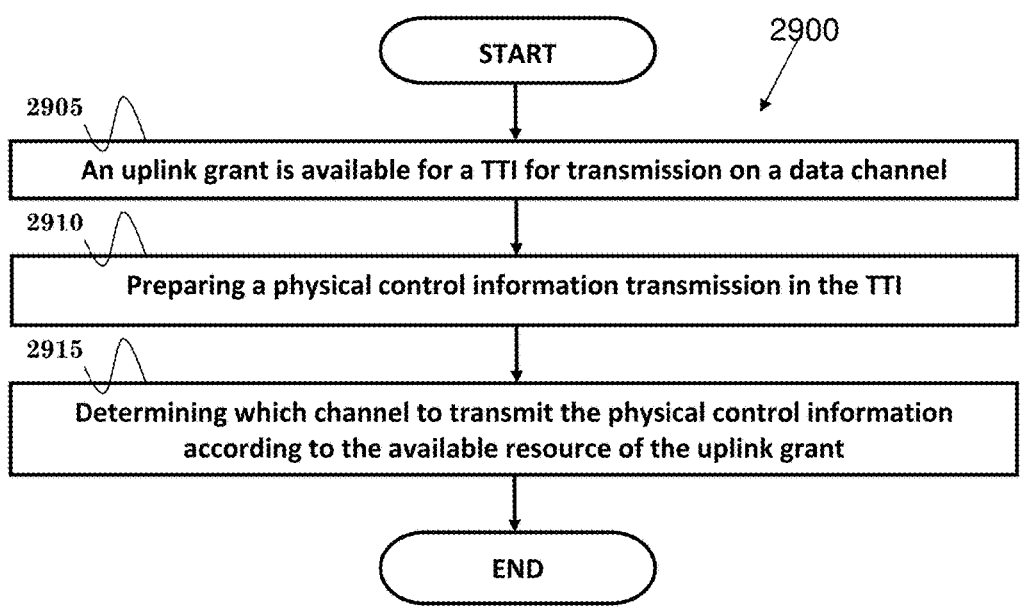
FIG. 29 is a flow chart according to one exemplary embodiment.

FIG. 29 is a flow chart 2900 according to one exemplary embodiment from the perspective of a UE. In step 2905, an uplink grant is available for a TTI for transmission on a data channel. In step 2910, the UE prepares a physical control information transmission in the TTI. In step 2915, the UE determines which channel to transmit the physical control information according to the available resource of the uplink grant. In one embodiment, determining which channel to transmit the physical control information according to the available resource of the uplink grant (shown in step 2915) means that transmitting the physical control information on a control channel in the TTI if the available resource of the uplink grant is less than a specific value, and transmitting the physical control information on the data channel in the TTI if the available resource of the uplink grant is more than a specific value.

Referring back to FIGS. 3 and 4, in one exemplary embodiment of a UE wherein an uplink grant is available for a TTI for transmission on a data channel, the device 300 includes a program code 312 stored in the memory 310. The CPU 308 could execute program code 312 to enable the UE (i) to prepare a physical control information transmission in the TTI, and (ii) to determine which channel to transmit the physical control information according to the available resource of the uplink grant. Furthermore, the CPU 308 can execute the program code 312 to perform all of the above-described actions and steps or others described herein.

Referring back to the embodiments illustrated in FIG. 28 and FIG. 29, in one embodiment, if the available resource of the uplink grant is less than a specific value, the UE transmits the physical control information on a control channel in the TTI. If the available resource of the uplink grant is more than a specific value, the UE transmits the physical control information on the data channel in the TTI.

In one embodiment, the available resource could be the TTI length of the uplink grant, or the number of PRB (pairs) of the uplink grant. The uplink grant could be received on a downlink control channel for a specific TTI. The uplink grant could be configured to be periodically available for UL transmission.

In one embodiment, the specific value could be different for different amount/payload size of physical control information. The specific value could be different for different modulation and coding scheme. The specific value could guarantee that the code rate of the physical control information would be above a threshold.

In one embodiment, the UE does not use the configured uplink grant for a transmission on the data channel if the physical control information is transmitted on a control channel. The UE is not allowed to perform transmission on the control channel and the data channel simultaneously.

Figure 30:
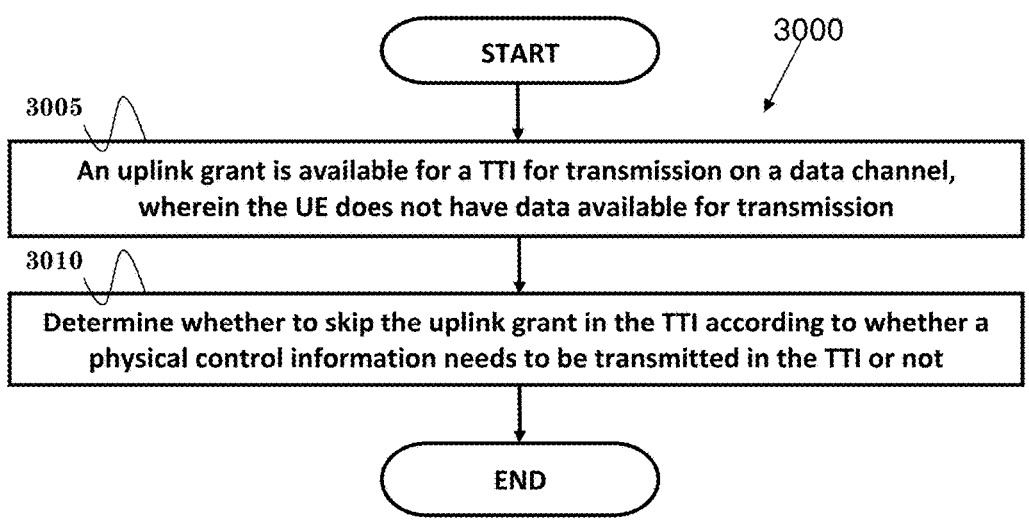
FIG. 30 is a flow chart according to one exemplary embodiment.

FIG. 30 is a flow chart 3000 according to one exemplary embodiment from the perspective of a UE. In step 3005, an uplink grant is available for the UE in a TTI, wherein the UE does not have data available for transmission. In step 3010, the UE determines whether to skip the uplink grant in the TTI according to whether a physical control information needs to be transmitted in the TTI or not.

Referring back to FIGS. 3 and 4, in one exemplary embodiment of a UE, wherein an uplink grant is available for the UE in a TTI and the UE does not have data available for transmission, the device 300 includes a program code 312 stored in the memory 310. The CPU 308 could execute program code 312 to enable the UE to determine whether to skip the uplink grant in the TTI according to whether a physical control information needs to be transmitted in the TTI or not. Furthermore, the CPU 308 can execute the program code 312 to perform all of the above-described actions and steps or others described herein.

Figure 31:
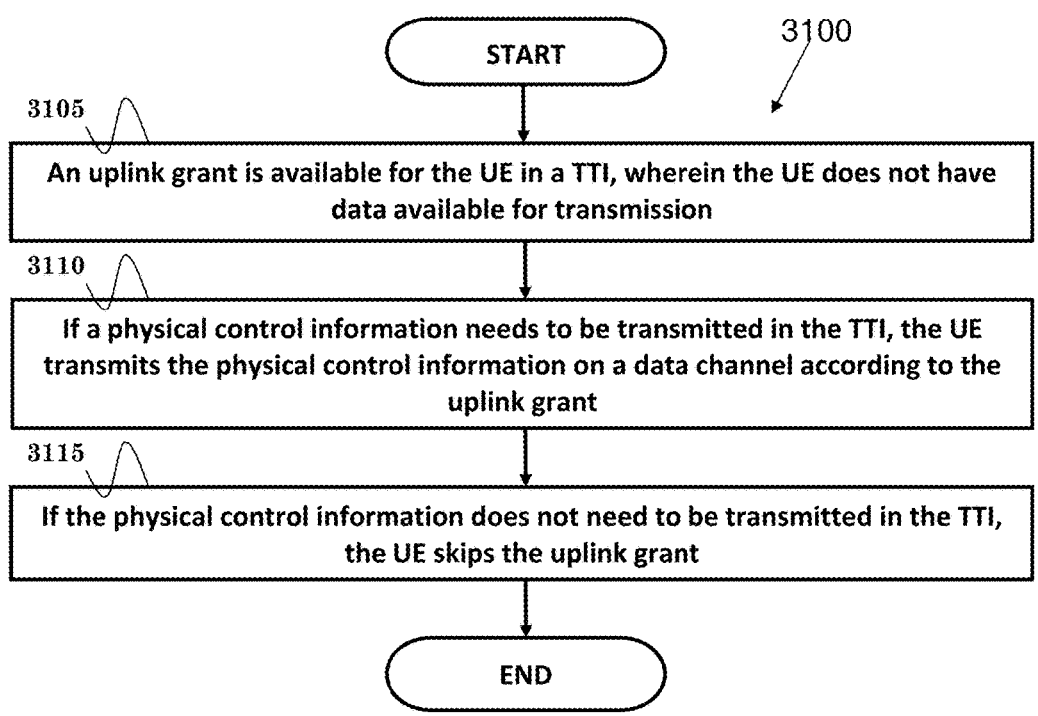
FIG. 31 is a flow chart according to one exemplary embodiment.

FIG. 31 is a flow chart 3100 according to one exemplary embodiment from the perspective of a UE. In step 3105, an uplink grant is available for the UE in a TTI, wherein the UE does not have data available for transmission. In step 3110, the UE transmits the physical control information on a data channel according to the uplink grant if a physical control information needs to be transmitted in the TTI. In step 3115, the UE skips the uplink grant if no physical control information needs to be transmitted in the TTI.

Referring back to FIGS. 3 and 4, in one exemplary embodiment of a UE, wherein an uplink grant is available for the UE in a TTI and the UE does not have data available for transmission, the device 300 includes a program code 312 stored in the memory 310. The CPU 308 could execute program code 312 to enable the UE (i) to transmit a physical control information on a data channel according to the uplink grant if the physical control information needs to be transmitted in the TTI, and (ii) to skip the uplink grant if no physical control information needs to be transmitted in the TTI. Furthermore, the CPU 308 can execute the program code 312 to perform all of the above-described actions and steps or others described herein.

Referring back to the embodiments shown in FIG. 30 and FIG. 31, in one embodiment, skipping the uplink grant means that the UE does not perform transmission on the data channel. The UE transmits the physical control information on the data channel with a transport block comprise a padding or a padding MAC (Medium Access Control) control element.

In one embodiment, the uplink grant could be a configured uplink grant that is periodically available. The uplink grant could be a dynamic grant specific for the TTI.

In one embodiment, the UE transmits the physical control information on the data channel without padding (or without padding MAC control element). To perform transmission on the data channel, the UE treats all the physical control information as a regular transport block from MAC layer and perform regular encoding for the all the physical control information. The UE would perform the transmission on the data channel like it would perform PUSCH transmission without UL-SCH data.

In one embodiment, the UE treat a first type of physical control information (such as CQI and/or PMI) as a regular transport block from MAC layer and perform regular encoding (such as CRC attachment, interleaving, and/or channel coding) for the first type of physical control information. The UE multiplexes a second type of physical control information (such as HARQ-ACK and/or RI) on some resources of the data channel. The UE indicates the payload size of physical control information on the data channel. Indication of the payload size is carried on some specific resources of the data channel. The indication of the payload size is done by masking a CRC of the data channel. The UE indicates whether or not the UE has data available for transmission on the data channel. The indication of whether or not the UE has data available for transmission is carried on some specific resources of the data channel. The indication of whether or not the UE has data available for transmission is done by masking a CRC of the data channel.

Based on above solutions or embodiments, physical control information could be transmitted more efficiently.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
an uplink grant is available for the UE in a TTI (Transmission Time Interval), wherein the UE does not have data available for transmission;
the UE determines whether to skip the uplink grant in the TTI according to whether a physical control information needs to be transmitted in the TTI or not; and
the UE transmits the physical control information on a data channel according to the uplink grant if the physical control information needs to be transmitted in the TTI.

2. The method of claim 1, wherein the uplink grant is a configured uplink grant that is periodically available.

3. The method of claim 1, wherein the uplink grant is a dynamic grant specific for the TTI.

4. The method of claim 1, wherein skipping the uplink grant means the UE does not perform transmission on the data channel.

5. The method of claim 1, wherein the UE transmits the physical control information on the data channel with a transport block comprise a padding or a padding MAC (Medium Access Control) control element.

6. A User Equipment (UE), wherein an uplink grant is available for the UE in a TTI (Transmission Time Interval) and the UE does not have data available for transmission comprising:
  a control circuit;
  a processor installed in the control circuit; and
  a memory installed in the control circuit and operatively coupled to the processor;
  wherein the processor is configured to execute a program code stored in the memory to:
    determine whether to skip the uplink grant in the TTI according to whether a physical control information needs to be transmitted in the TTI or not; and
    transmit the physical control information on a data channel according to the uplink grant if the physical control information needs to be transmitted in the TTI.

7. The UE of claim 6, wherein the uplink grant is a configured uplink grant that is periodically available.

8. The UE of claim 6, wherein the uplink grant is a dynamic grant specific for the TTI.

9. The UE of claim 6, wherein skipping the uplink grant means the UE does not perform transmission on the data channel.

10. The UE of claim 6, wherein the processor is further configured to execute a program code stored in the memory to:
  transmit the physical control information on the data channel with a transport block comprise a padding or a padding MAC (Medium Access Control) control element.

11. A method of a UE (User Equipment), comprising:
  an uplink grant is available for the UE in a TTI (Transmission Time Interval), wherein the UE does not have data available for transmission;
  the UE transmits a physical control information on a data channel according to the uplink grant if the physical control information needs to be transmitted in the TTI; and
  the UE skips the uplink grant if the physical control information does not need to be transmitted in the TTI.

12. The method of claim 11, wherein the uplink grant is a configured uplink grant that is periodically available.

13. The method of claim 11, wherein the uplink grant is a dynamic grant specific for the TTI.

14. The method of claim 11, wherein skipping the uplink grant means the UE does not perform transmission on the data channel.

15. The method of claim 11, wherein the UE transmits the physical control information on the data channel with a transport block comprise a padding or a padding MAC (Medium Access Control) control element.

16. A User Equipment (UE), wherein an uplink grant is available for the UE in a TTI (Transmission Time Interval) and the UE does not have data available for transmission comprising:
  a control circuit;
  a processor installed in the control circuit; and
  a memory installed in the control circuit and operatively coupled to the processor;
  wherein the processor is configured to execute a program code stored in the memory to:
    transmit a physical control information on a data channel according to the uplink grant if the physical control information needs to be transmitted in the TTI; and
    skip the uplink grant if the physical control information does not need to be transmitted in the TTI.

17. The UE of claim 16, wherein the uplink grant is a configured uplink grant that is periodically available.

18. The UE of claim 16, wherein the uplink grant is a dynamic grant specific for the TTI.

19. The UE of claim 16, wherein skipping the uplink grant means the UE does not perform transmission on the data channel.

20. The UE of claim 16, wherein the processor is further configured to execute a program code stored in the memory to:
  transmit the physical control information on the data channel with a transport block comprise a padding or a padding MAC (Medium Access Control) control element.

21. The method of claim 1, wherein the physical control information includes at least one of Channel Quality Indicator (CQI), Precoding Matrix Index (PMI), Rank Indicator (RI), and Hybrid Automatic Repeat reQuest (HARQ) feedback.

22. The UE of claim 6, wherein the physical control information includes at least one of Channel Quality Indicator (CQI), Precoding Matrix Index (PMI), Rank Indicator (RI), and Hybrid Automatic Repeat reQuest (HARQ) feedback.

23. The method of claim 11, wherein the physical control information includes at least one of Channel Quality Indicator (CQI), Precoding Matrix Index (PMI), Rank Indicator (RI), and Hybrid Automatic Repeat reQuest (HARQ) feedback.

24. The UE of claim 16, wherein the physical control information includes at least one of Channel Quality Indicator (CQI), Precoding Matrix Index (PMI), Rank Indicator (RI), and Hybrid Automatic Repeat reQuest (HARQ) feedback.

25. The method of claim 1, wherein the data channel is Physical Uplink Shared Channel (PUSCH).

26. The UE of claim 6, wherein the data channel is Physical Uplink Shared Channel (PUSCH).

27. The method of claim 11, wherein the data channel is Physical Uplink Shared Channel (PUSCH).

28. The UE of claim 16, wherein the data channel is Physical Uplink Shared Channel (PUSCH).

* * * * *